US009036478B2

(12) United States Patent
Torab Jahromi et al.

(10) Patent No.: US 9,036,478 B2
(45) Date of Patent: May 19, 2015

(54) SECURING TRANSMIT OPENINGS BY THE REQUESTER

(71) Applicant: Broadcom Corporation, Irvine, CA (US)

(72) Inventors: Payam Torab Jahromi, Laguna Niguel, CA (US); Gang Lu, Pleasanton, CA (US)

(73) Assignee: Broadcom Corporation, Irvine, CA (US)

( * ) Notice: Subject to any disclaimer, the term of this patent is extended or adjusted under 35 U.S.C. 154(b) by 94 days.

(21) Appl. No.: 13/739,180

(22) Filed: Jan. 11, 2013

(65) Prior Publication Data

US 2014/0198692 A1    Jul. 17, 2014

(51) Int. Cl.
*H04J 1/16* (2006.01)
*H04L 29/06* (2006.01)

(52) U.S. Cl.
CPC .................................... *H04L 69/02* (2013.01)

(58) Field of Classification Search
CPC ..... H04L 12/413; H04L 12/417; H04L 12/43; H04L 25/49; H04L 49/254; H04W 74/08; H04W 74/0816; H04W 74/0825; H04Q 11/04; H04J 3/00; H04J 3/245

USPC ......... 370/445, 447, 450, 454, 458, 459, 461, 370/462, 235, 229, 395.4
See application file for complete search history.

(56) References Cited

U.S. PATENT DOCUMENTS

2012/0127937 A1    5/2012    Singh et al.
2012/0163353 A1    6/2012    Cordeiro
2014/0016567 A1*   1/2014    Lu et al. ...................... 370/329

OTHER PUBLICATIONS

U.S. Appl. No. 09/196,339, filed Nov. 19, 1998.

* cited by examiner

*Primary Examiner* — Brenda H Pham
(74) *Attorney, Agent, or Firm* — Brinks Gilson & Lione

(57) ABSTRACT

Techniques for securing transmit opening help enhance the operation of a station that employs the technique. The techniques may facilitate low latency response to a protocol data requester, for instance. The techniques provide ways for the protocol data requester to provide additional time for the protocol data responder to obtain the needed response data for the protocol data requester. One way in which this can be done is by intelligently lengthing the protocol request transmitted by the protocol requester.

20 Claims, 29 Drawing Sheets

SECURING TRANSMIT OPENINGS BY THE REQUESTER

BACKGROUND

1. Technical Field

This disclosure relates to communication protocols. In particular, this disclosure relates to how a data requester may provide the time that a data responder needs to obtain the requested data and respond without delay.

2. Related Art

Continual development and rapid improvement in wireless communications technologies have led the way to increased data rates and extensive wireless functionality in many different environments, including the home and business environments. These developments and improvements have been driven in part by the widespread adoption of digital media, including high definition video and music. The most recent developments in wireless connectivity promise new functionality and increased data rates. These recent developments include the Wireless Gigabit Alliance (WiGig) 60 GHz wireless specification as well as the IEEE 802.11 specification.

The WiGig specification provides data transmission rates of up to 7 Gbps in a single stream. At the same time, the WiGig specification implements backward compatibility with the 802.11 standard. Another benefit of the WiGig specification is that devices in the 60 GHz ecosystem will have the bandwidth to wirelessly communicate significant amounts of information without performance compromises, thereby eliminating the current need for tangles of cables to physically connect devices. WiGig devices may, for example, wirelessly stream high definition video content directly from a Blu-Ray player to a TV with little or no compression required. Improvements in wireless communications will help continue to drive demand for wireless devices.

BRIEF DESCRIPTION OF THE DRAWINGS

The system may be better understood with reference to the following drawings and description. In the figures, like reference numerals designate corresponding parts throughout the different views.

DETAILED DESCRIPTION

This description relates to communications by stations under standards such as the IEEE 802.11 standards and the WiGig standards, including the 60 GHz wireless specification promoted by the Wireless Gigabit Alliance and the IEEE 802.11TGad standard. Accordingly, the discussion below makes reference, for example, to transmission opportunities (TXOPs), Service Periods (SPs), and reverse direction (RD) grants (RDGs). The RDGs are part of the RD protocol that permits an RD responder to transmit data back to the RD initiator, even though the RD initiator presently holds the current transmission opportunity (TXOP) or owns the Service Period (SP). The RD initiators and RD responders may be stations that communicate wirelessly or over physical connections.

The stations may take many different forms. As examples, the stations may be cell phones, smart phones, laptop computers, personal data assistants, pocket computers, tablet computers, portable email devices, people or pets, or processes or threads executed in memory by a processor. Additional examples of stations include televisions, stereo equipment such as amplifiers, pre-amplifiers, and tuners, home media devices such as compact disc (CD)/digital versatile disc (DVD) players, portable MP3 players, high definition (e.g., Blu-Ray™ or DVD audio) media players, or home media servers. Other examples of stations include musical instruments, microphones, climate control systems, intrusion alarms, audio/video surveillance or security equipment, video games, network attached storage, network routers and gateways, pet tracking collars, or other devices.

Stations may be found in virtually any context, including the home, business, public spaces, or automobile. Thus, as additional examples, stations may further include automobile audio head ends or DVD players, satellite music transceivers, noise cancellation systems, voice recognition systems, climate control systems, navigation systems, alarm systems, engine computer systems, or other devices. Stations may be referred to below with the abbreviation STA.

Figure 1:
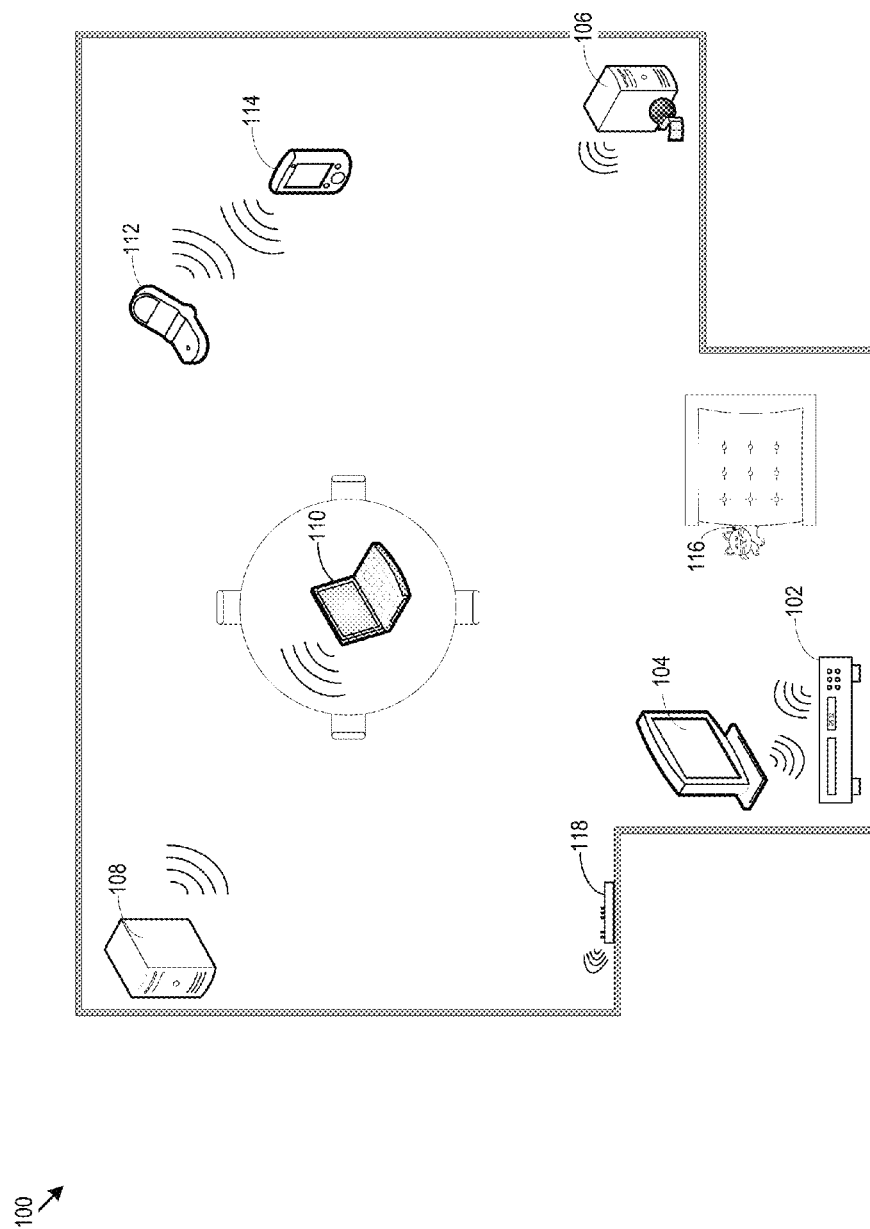
FIG. 1 shows an example environment in which wireless stations communicate with one another.

FIG. 1 shows an example environment 100 in which stations communicate with one another. In this example, the environment 100 is a room in a home, but the environment could be located anywhere and used for any purpose. The environment 100 includes multiple stations that communicate wirelessly with the other stations. In FIG. 1, a media player 102 (e.g., a Blu-Ray™) streams high definition video and audio content to a high definition liquid crystal display (LCD) (e.g., a high resolution computer display, a television (TV), or the like) 104. Similarly, a home media server 106 with a wireless network interface streams audio (e.g., MP3 content) and video (e.g., MP4, AVI, or MPEG content) to other stations in the environment 100.

Other examples of stations in the environment 100 include the application and file server 108 that is in communication with the laptop computer 110 and other stations. FIG. 1 also shows a smartphone 112 and a portable gaming system 114 wirelessly exchanging information (e.g., text messages or video game saved game files), as well as a pet tracking collar 116 in communication with a house monitoring system 118 that helps locate the clever house cat. Other stations may exist in the environment, and different environments may include additional, fewer, or different stations.

The stations may communicate wirelessly according to the 802.11a/b/g/n/ac/ad standards, according to the WiGig 60 GHz specification, or according to other wireless standards. In some cases, such as with the WiGig or 802.11n/ac/ad standards, a network controller may allocate SPs or TXOPs to a station through, for example, a channel access contention process. During a SP/TXOP, the station that owns the SP/TXOP is entitled to a specific window of time to transmit information without other stations attempting to access the channel. SPs and TXOPs are examples of transmit openings for the stations.

Furthermore, the stations may implement a Reverse Direction (RD) protocol that permits a RD initiator to grant a RD responder the opportunity to transmit data back to the RD initiator during the RD initiator's TXOP or SP. A RD grant is referred to as an RDG below. The RDG is another example of a transmit opening for the station that has the RDG.

In some instances, a TXOP owner or RD responder has access to the channel, but no data ready to send. Similarly, a station may have received a data request, but may have no response data yet ready to send. In those instances, the station that will send the response data may secure an opportunity to transmit the response data by sending certain types of holding information that extends the transmit opening until the response data is ready for transmission. The response data may be data requested under a particular protocol in place between the stations, as will be described below.

The discussion below refers to the LCD 104 and the media player 102 to aid understanding, but it is noted that the techniques described below may be employed in any environment by any stations. The techniques described below facilitate securing (e.g., holding open or extending) a transmit opening, until response data meant for the transmit opening is ready and available to send. One reason to hold the transmit opening is that transmit openings may be infrequent, and not being able to use one may result in an undesirable latency to send the response data.

Several new time-sensitive protocols are being defined over 802.11 networks, and others may be created in the future. This is particularly true with respect to 802.11ad (i.e., 60 GHz), for which new applications with corresponding protocol adaptation layers exist or are arising for video, audio, and general purpose data input/output. Several examples of such protocols which benefit from low latency and fast response to data requests include the following. It is noted that the following examples are not limiting, and that the techniques described in this document may apply to other protocols or communication techniques of any nature that benefit from low latency communication.

WiGig Bus Extension (WBE). One use case for WBE is to wirelessly carry Peripheral Component Interconnect (PCI) payloads over 802.11 ad radio. As such, WBE may consume high bandwidth and benefit from low latency. In the context of WBE, a Memory Read (MRd) is an example of a protocol data request. A Memory Read Completion returns the result of the memory read operation from a specified address space and is an example of a protocol data response. The techniques described below can help reduce memory read latency.

WiGig Serial Extension (WSE). One use case for WSE is to wirelessly carry Universal Serial Bus (USB) payload over 802.11 radio. Compared to WBE, WSE may have a broader range of applications that would motivate the use of the protocol over many different varieties of 802.11, such as 802.11ac and 802.11n. In the context of a USB OUT transfer, a Transfer Request (TransferReq) seeking immediate acknowledgement in the form of a Transfer Response (TransferResp) is an example of a protocol data request. A Transfer Response (TransferResp) is an example of a protocol data response. In the context of a USB IN transfer, a Transfer Response seeking immediate acknowledgement in the form of a Transfer Acknowledgement (TransferAck) is an example of a protocol data request, and a Transfer Acknowledgement (TransferAck) is an example of a protocol data response. When a transmitted packet indicates the need or the possibility for an acknowledgement, the techniques below can reduce the latency associated with the acknowledgement.

WiGig Display Extension (WDE). One use case for WDE is to carry high quality audio/video content over 802.11ad. WDE may also find its way to 802.11ac for some video profiles. As WDE evolves over time, it may give rise to situations in which the techniques described in this document may be used to provide lower latency response options under the protocol.

WiGig SD Extension (WSD). One use case for WSD is to carry Secure Digital/Secure Digital Input Output (SD/SDIO) traffic over the 802.11 ad radio. WSD also has the potential to see an extended operation over some other varieties of 802.11, such as 802.11ac and 802.11n. Like WDE, as WSD evolves over time, it may give rise to situations in which lower latency response options can be provided using the techniques described in this document.

Fast Link Adaptation (FLA): 802.11ad provides for a mechanism to obtain quick feedback on link attributes such as Signal-to-Noise Ratio (SNR), Modulation and Coding Scheme (MCS) recommendations by the receiver, or other link attributes. A response to the request for feedback (i.e., the Link Measurement Response in 802.11 ad) is required to be received in no greater than a specified time: the Beam Refinement Protocol Interframe Spacing (BRPIFS) (defined as 40 μs). The techniques described in this disclosure provide a way to facilitate a timely response. Without securing the transmit opening using these techniques, a third station, for example, could take ownership of the wireless medium, possibly for more than the BRPIFS, which would make meeting the BRPIFS timing on a deterministic basis difficult or impossible.

Beam Refinement Protocol (BRP): 802.11ad also provides for a Beam Refinement Protocol (BRP) that allows 802.11ad stations to fine tune the transmit and receive antenna settings beyond sector granularity by sending (and using) training fields in-band with normal MAC frames. The PPDU containing the feedback information is required to be received anywhere between the Short Interframe Spacing (SIFS) and BRPIFS (between 3 and 40 μs). The techniques described in this disclosure facilitate receiving a timely response. As with the FLA example above, without securing the transmit opening, a third station could take ownership of the wireless medium, possibly for more than the BRPIFS, which would make meeting the BRPIFS timing on a deterministic basis difficult or impossible.

These example protocols will benefit from techniques that secure the transmit openings, and that help to keep low any data response latency. The techniques for securing the transmit opening allow, for example, a sender of protocol data with transmit access to the radio to extend its transmit access on a flexible basis until the protocol transmitter has the protocol data ready to send. Without these techniques, the sender of protocol data might otherwise have to give up the transmit opportunity (because it does not have any data to send), and wait for the next transmit opening. The next transmit opening may be long in coming; too long for protocol compliance, and too long to avoid reduced protocol performance.

Some of the examples described below make reference to a protocol data requester and a protocol data responder. However, the techniques are not limited to request-response semantics. For example, a sender of any data may apply these techniques whenever low latency is desirable. More generally, any station may be a sender that secures a transmit opening, and any station may be an initiator or requester that provides the sender with the opening to send data. Thus, while the techniques may facilitate a low latency protocol data response from station B in response to a protocol data request made by station A (the initiator), the techniques may also facilitate low latency transmission of data from a source station to a destination station during transmit opportunities (or other types of openings) scheduled by a network scheduler (the initiator) for the source station. Furthermore, the description below notes in some instances the B/ACKs are sent, or may be sent when required by the protocol at hand. Accordingly, the presence or absence of the B/ACK packets is not a required part of the techniques described below for holding transmit openings, but may instead be driven by protocol requirements. In addition, while the examples below make reference to QoS data frames, QoS Null frames and other types of frames, the response/request exchanges may be any exchange of valid MAC frames. As a specific example, for FLA and BRP, the request and response frames may be management frames.

Figure 2:
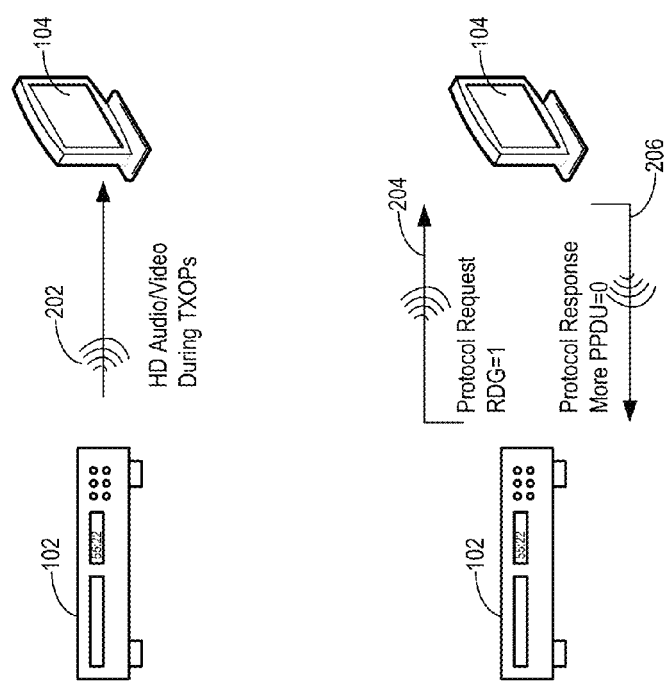
FIG. 2 shows an example of a reverse direction grant initiator communicating with a reverse direction grant responder.

The 802.11 standard defines a Reverse Direction (RD) protocol, through which the owner of a transmit opportunity (the RD grantor) grants transmission rights (and thus a transmit opening) to a peer station (the RD grantee). With reference to FIG. 2, consider a protocol (application) exchange over the 802.11 Media Access Control (MAC) and Physical (PHY) layers, in which the LCD 104 and the media player 102 desire to quickly exchange protocol packets, and employ the RD protocol. As shown in FIG. 2, prior to the protocol data request, the media player 102 streams HD audio/video 202 to the LCD 104 during TXOPs or SPs granted by the network. For the purposes of discussion, assume the media player 102 then sends a protocol data request 204, and the LCD 104 sends a protocol data response 206. As one example, the media player 102 may send the protocol data request 204 in order to obtain environmental data (e.g., brightness) sensed by the LCD 104 that the media player 102 will take into consideration for rendering the HD audio/visual data communicated to the LCD 104. With the protocol data request 204, the media player 102 sets the RD grant indicator to 1 to indicate to the LCD 104 that it may communicate data back to the media player 102 during the TXOP or SP for the media player 102. Again, the exchange need not be driven by request-response semantics; those semantics are used as an example to help demonstrate the desire for a low latency transmission by the LCD 104 at the protocol level with protocol data responsive to the protocol request packet from the media player 102.

Ordinarily, when the LCD 104 has the data ready to send at the time of the request from the media player 102, the LCD 104 accepts the RDG and transmits the protocol data, according to the established RD protocol. However, under the RD protocol, when the LCD 104 does not have the data ready to send, the LCD 104 passes the opening to transmit back to the media player 102, and the LCD 104 waits for its next opportunity to transmit. One problem is that the LCD 104 may not have a chance to transmit for a long time after the LCD 104 gives away or gives back the transmit opening to the media player 102. One reason is that the media player 102 may have a large amount of data to transmit. Another reason is that the media player 102 may reach the end of its Service Period (SP) or TXOP, and the next time that the LCD 104 or the media player 102 will have an opportunity to transmit data may be even further delayed. Yet another reason is that a different station altogether may gain access to or take control of the wireless communication medium, possibly for a significant duration of time.

Figure 3:
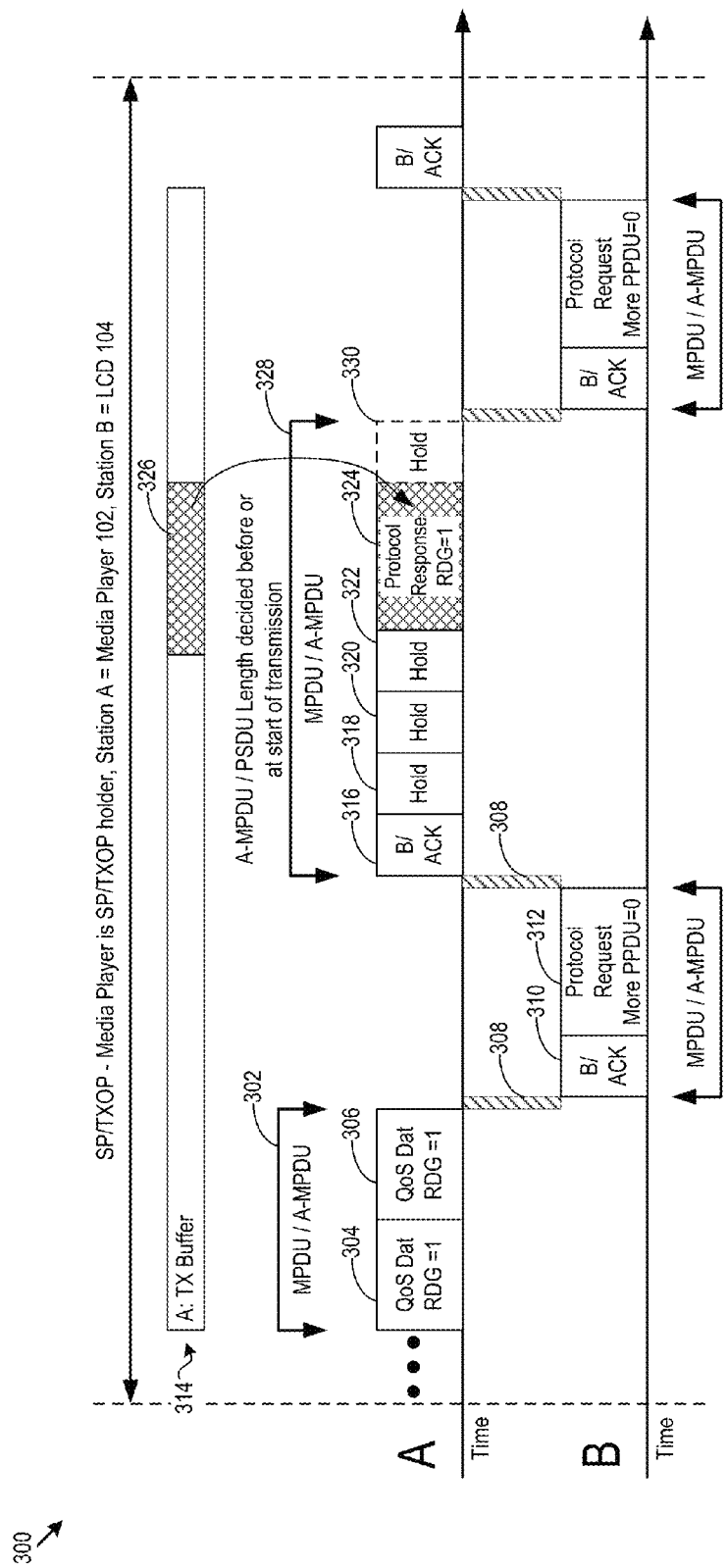
FIG. 3 shows an example communication diagram of a data responder and a data requester, in which the data responder secures an opportunity to transmit.
Figure 4:
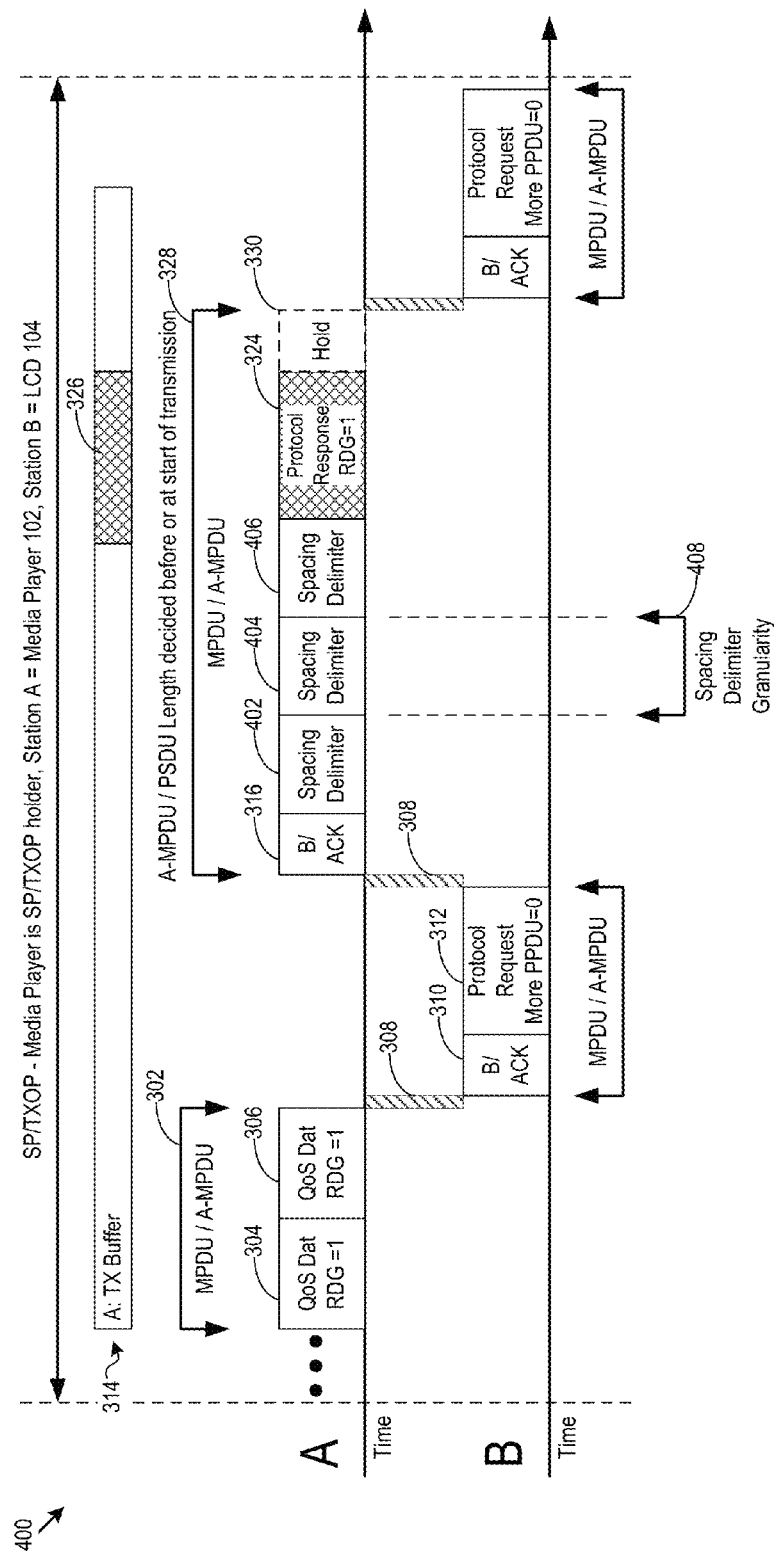
FIG. 4 shows an example communication diagram of a data responder and a data requester, in which the data responder secures an opportunity to transmit using delimiters.
Figure 5:
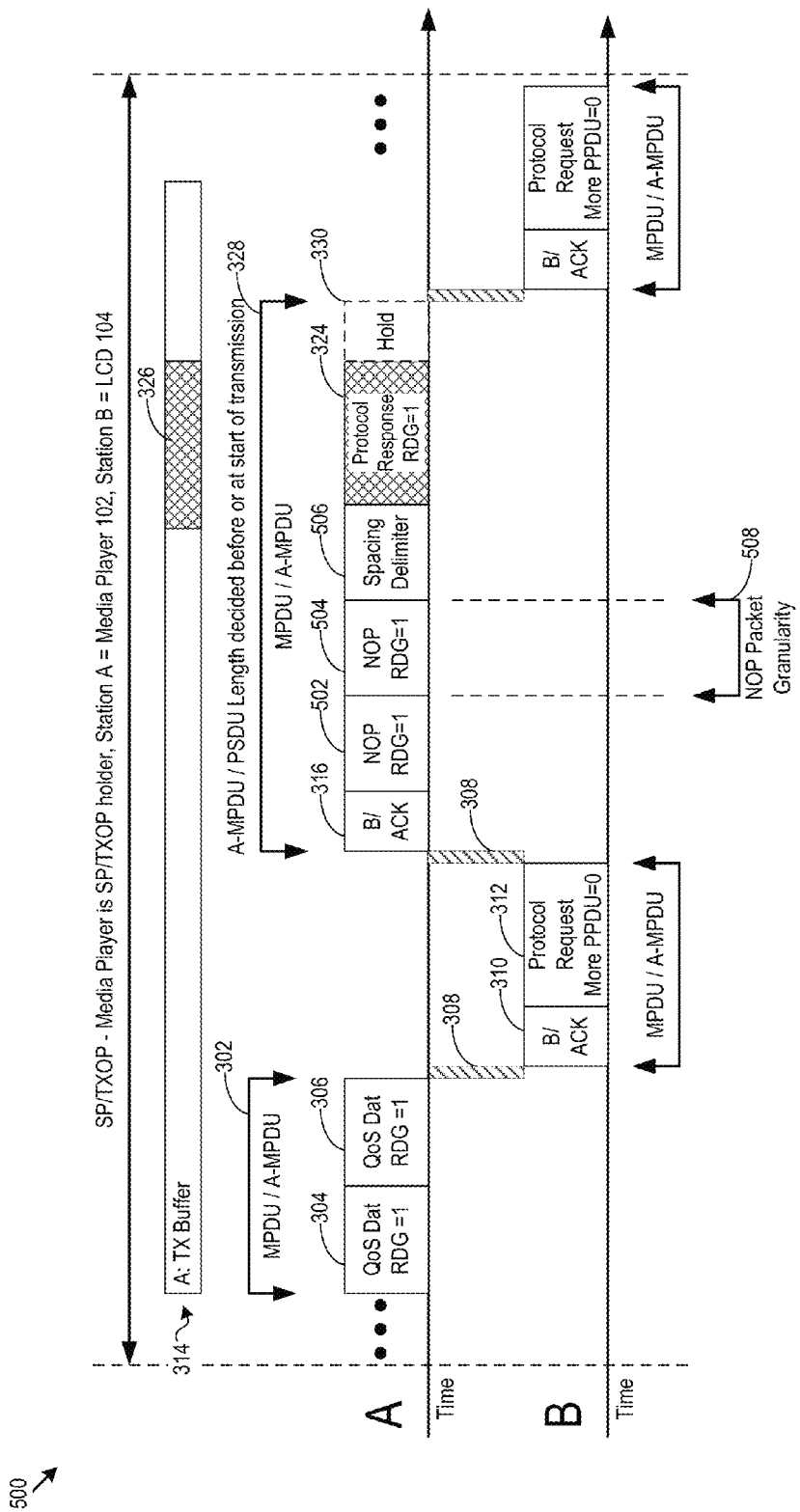
FIG. 5 shows an example communication diagram of a data responder and a data requester, in which the data responder secures an opportunity to transmit using NOP packets and delimiters.

FIGS. 3, 4, and 5 show example communication diagrams 300, 400, and 500 respectively, of a data responder and a data requester, in which the data responder secures an opening to transmit. In particular, in the diagrams 300, 400, and 500, station A is the media player 102, station B is the LCD 104, and station A owns the current SP or TXOP. Accordingly, station A will issue RDGs to station B.

With reference to FIG. 3, the media player 102 transmits an aggregation 302 of QoS Data frames 304 and 306 and possibly other frames such as QoS Null frames or management frames in which the media player 102 has set the RDG bit to 1 in at least one QoS frame. The stations may organize and aggregate the QoS Data frames, or other types of frames, into media access control (MAC)-level protocol data units (MPDUs) or Aggregated MAC Protocol Data Unit (A-MPDUs) carried by Physical (PHY) layer protocol data units (PPDUs), for example. Setting the RDG bit to 1 indicates to the destination addressee (in this example the LCD 104) that it has an opportunity to establish a reverse direction transmission right. As such, the LCD 104 may accept the RDG and communicate back to the RDG initiator (in this case the media player 102). The LCD 104 responds to the RDG after the Short Interframe spacing (SIFS) interval 308 (defined separately for each 802.11 variant, defined as 3 μs for 802.11ad). The LCD 104 does so by transmitting an acknowledgement (ACK) or block acknowledgement (B/ACK) 310 (if expected by the communication protocol), followed by one or more QoS Data frames 312 or other frames such as QoS Null frames or management frames. In its transmission, the LCD 104 may set the More PPDU bit to 1 (e.g., in a QoS Data frame or QoS Null frame, or other frame) to indicate that the LCD 104 has additional data to transmit to the media player 102, or to 0 to indicate that the LCD 104 has no further data to transmit. In this example, More PPDU=0.

In the example of FIG. 3, the LCD 104 sends a protocol data request during the RDG to the media player 102 in the QoS Data frame 312. The LCD 104 sets MorePPDU to 0 to indicate that the LCD 104 is done transmitting data, and the transmission right returns to the media player 102. The protocol data request may be any type of request for data from the media player 102, including data requested under any of the example protocols noted above.

The media player 102 may use a portion of its SP/TXOP as a transmit opening to respond to the protocol data request issued by the LCD 104. However, the media player 102 does not have data yet ready with which to respond to the LCD 104. In particular, FIG. 3 shows that at the time of the protocol data request, the media player 102 transmit (TX) buffer 314 has no data responsive to the protocol data request, although the TX buffer 314 may currently have other data that is not responsive to the data request. Instead of ending its SP/TXOP or otherwise missing the opening to transmit data, the media player extends the opening to transmit data. In particular, the media player 102 may decide upon an overall length for an A-MPDU/Physical Layer Service Data Unit (PSDU) to transmit. The overall length may include the length of the anticipated or estimated protocol response, the anticipated or estimated amount of holding information, B/ACK, and other components of the response. The overall length may be included in the PPDU header sent with the transmission, e.g., under the 802.11 protocol. However, in certain implementations of 802.11 protocol the overall length in the PPDU header does not need to match the actual PSDU length. For example, the length in the PPDU header could be a large number based on an initial assumption, but the PSDU length could be shorter, and the receiving station would still be able to correctly receive the MAC frames in the PPDU. In addition, in other implementations with communications adhering to other standards, the overall length may not need to be determined prior to transmission. The media player 102 may begin its transmission with an acknowledgement 316 of the LCD player 104 MPDU/A-MPDU, and then begin to transmit holding information. The holding information may include any information, other than the requested data, that takes the place of the requested data in the response. The holding information has the effect of keeping the transmit opening with the responding station, even though the responding station is not sending the requested data.

In the example shown in FIG. 3, the media player 102 sends the holding information 318, 320, and 322 in its transmission 328. By the time that the media player 102 has sent the holding information 322, the TX buffer 314 has data responsive to the protocol data request ready to transmit. Accordingly, the media player 102 transmits one or more data frames 324 (e.g., QoS Data frames) that include the response data 326 instead of continuing to send holding information. Note that the media player 102 may also transmit additional holding information after transmission of the response data 326. The additional holding information may include one or more additional holding information frames 330. The media player 102 may transmit the additional holding information frames 330 in order to extend the transmission 328 to reach the overall length initially determined for the transmission 328. However, in certain implementations of the 802.11 protocol, or in other implementations in which the applicable communication standard does not require strict compliance with the overall length initially determined and specified in the PPDU header, the media player 102 may omit the additional holding information 330, or may transmit fewer additional holding information frames 330 than what is necessary to reach the overall length initially determined for the transmission 328.

FIG. 4 continues the example of FIG. 3. FIG. 4 shows that the holding information may include a spacing delimiter. FIG. 4 shows an example in which the media player 102 transmits three spacing delimiters 402, 404, and 406 while waiting for protocol response data to become available in the TX buffer 314. When the protocol response data is available, the media player 102 sends the data frames 324 that contain the protocol response data. The spacing delimiter has a certain granularity 408 and as such, the media player 102 may extend the transmit opening in units of the granularity 408 until protocol response data is available (or until the SP or TXOP ends). The spacing delimiter may be implemented as an 802.11 MPDU delimiter with the MPDU length field set to zero, resulting in a unit of information that includes 32 bits of header information and no payload. The granularity of such a spacing delimiter is 32 bits or 4 bytes. However, the techniques described in this document may employ any other implementation of a spacing delimiter.

FIG. 5 also continues the example of FIG. 3. FIG. 5 shows that the holding information may include a holding packet labeled as a No Operation (NOP) packet. More specifically, FIG. 5 shows an example in which the media player 102 transmits two NOP packets 502 and 504, then a spacing delimiter 506 while waiting for protocol response data to become available in the TX buffer 314. The NOP packet granularity 508 may be different than the spacing delimiter granularity 408, and the media player 102 may mix different types of holding information in any combination and sequence to extend the transmit opening as desired. The NOP packet may carry command or control data, including clock timing or other synchronization data, from the media player 102 to the LCD 104, for example. Thus, although the protocol response data is not yet available, the media player 102 may still communicate useful information (including no information) in the NOP packet. In other words, the NOP packet also includes protocol packets that are not considered a direct response to the request, or protocol packets that are normally sent with limited frequency because they would add to the protocol overhead (e.g., buffer occupancy or timing synchronization information).

The holding information, such as a particular packet type, may be defined at the MAC level. Such a packet may be defined to include a variable-sized payload that carries any particular holding data, such as all zeros, or command, control, or timing information. The receiver may discard the payload at the MAC receiving layer. Such a MAC-level packet may be application independent, and may be inserted into an A-MPDU or other wrapper one or more times to extend the transmit opening for as long as desired, at the granularity of the MAC-level holding packet.

The holding packet may also be defined at the protocol level, e.g., as a protocol-level no-operation (NOP) packet. One or more protocol level holding packets may extend the ownership of the transmit opening until the protocol response data is available for transmission. The holding packet may therefore be a protocol-level packet that does not trigger any protocol action. However, depending on the definition of the holding packet at the protocol level, the holding packet may trigger actions or convey selected data, such as a timestamp, buffer availability, or other data.

In other words, the holding packet (e.g., the NOP packet) may be implemented as a valid protocol-level packet or MAC level packet. The holding packet may have a fixed size or a variable payload size to make transmit opening extension flexible. To the MAC, the holding packet is a valid MAC frame. An arbitrary number of holding packets (subject to A-MPDU aggregation limits, PPDU duration limits, and SP/TXOP duration) of different sizes may be transmitted during the transmit opening. Transmitting multiple holding packets also provides the advantage that RD information repeated between the holding packets (if they support the MAC header that carries the RD information) has a better chance of surviving the transmission to the receiver. Furthermore, the sender may size the holding packets to meet the density or timing (e.g., Minimum MPDU Start Spacing) requirements of the receiving station, or the sender may pad the holding packets with zero bytes to meet the density or timing requirements of the receiving station.

As noted above, a transmitting station may mix different types of holding information (e.g., the spacing delimiter and the NOP packet) to extend the transmit opening. In some implementations, the spacing delimiters may be short (e.g., 4 bytes) and result in low granularity and low latency. Spacing delimiters, because they are not MPDUs, do not need MAC-level encryption or need to observe Sequence Number (SN) rules. The sender may repeat NOP as often as desired, bringing robustness to the RD mechanism, with appropriate management of SNs and encryption.

Figure 6:
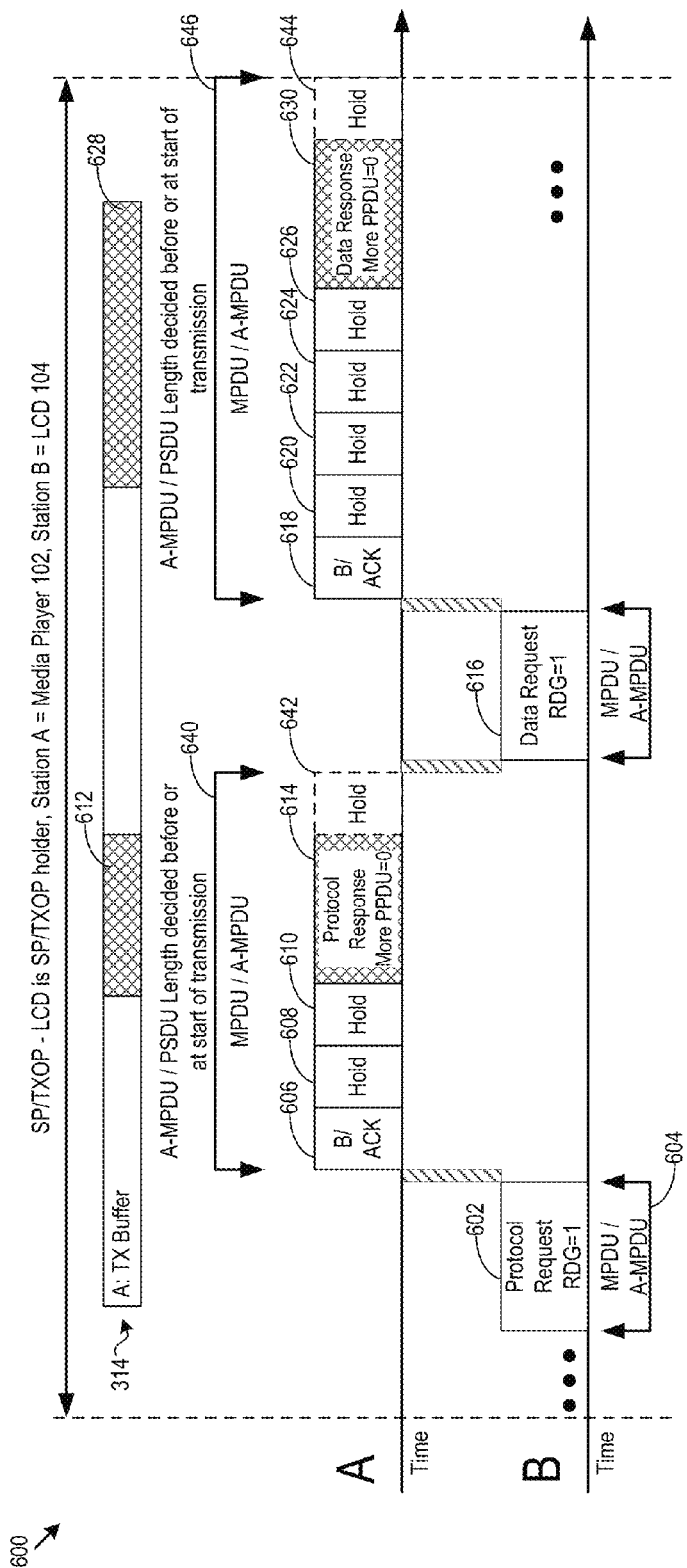
FIG. 6 shows an example communication diagram of a data responder and a data requester, in which the data responder secures an opportunity to transmit.
Figure 7:
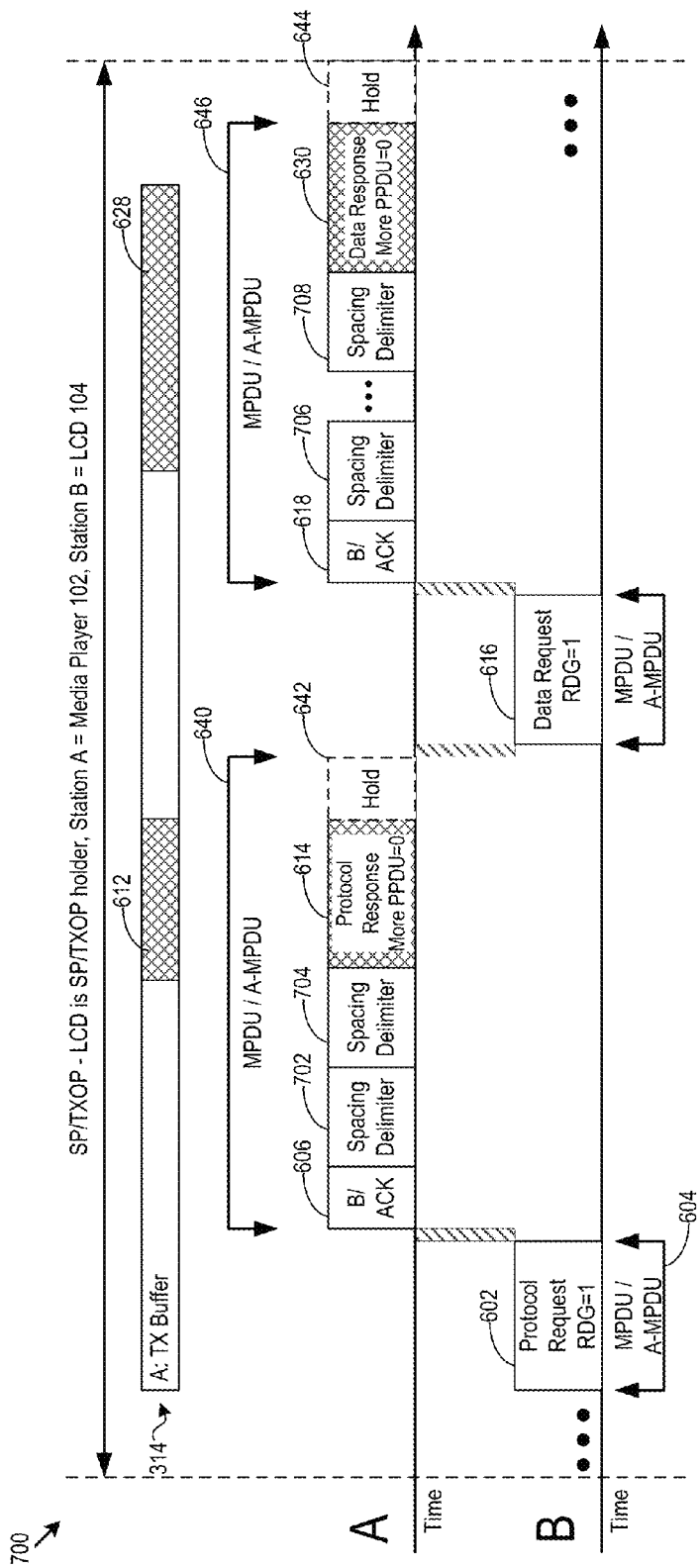
FIG. 7 shows an example communication diagram of a data responder and a data requester, in which the data responder secures an opportunity to transmit using delimiters.
Figure 8:
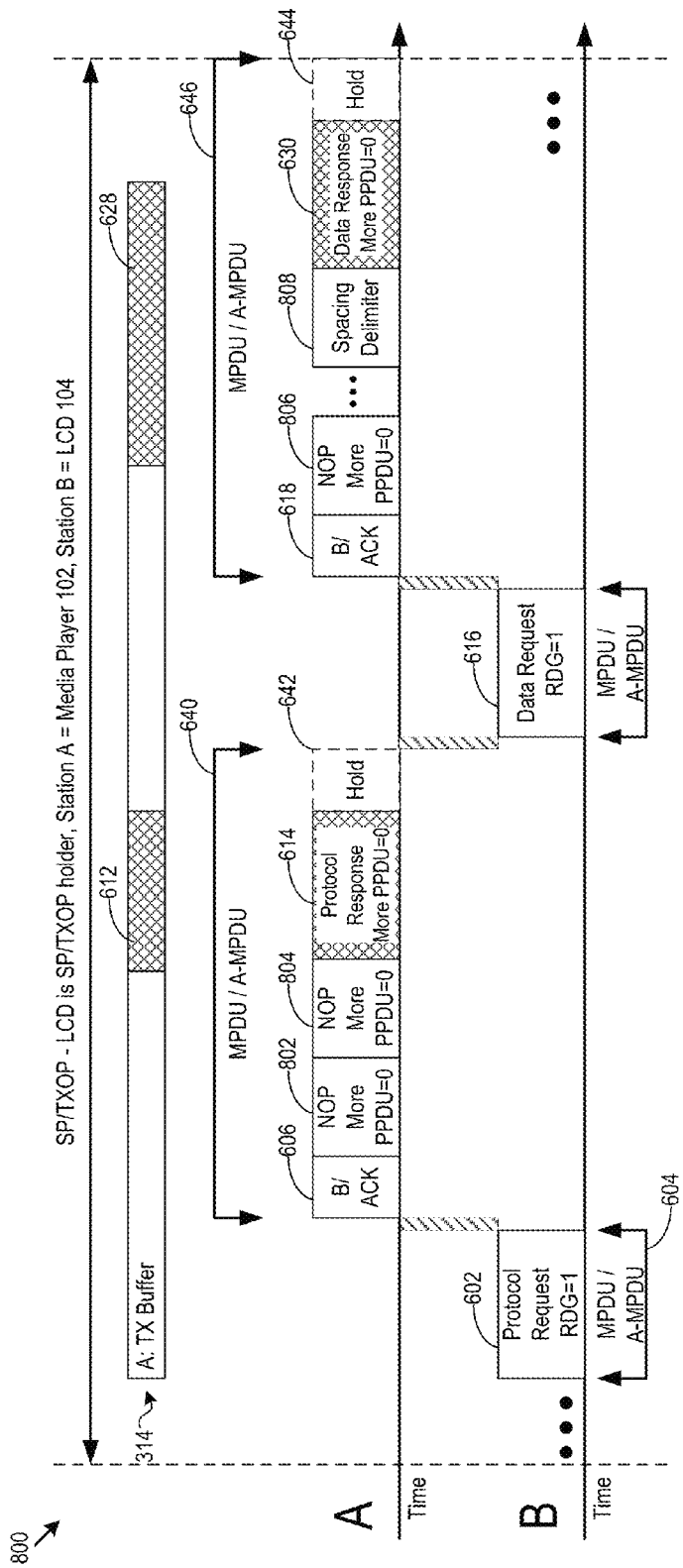
FIG. 8 shows an example communication diagram of a data responder and a data requester, in which the data responder secures an opportunity to transmit using NOP packets and delimiters.

FIGS. 6, 7, and 8 show example communication diagrams 600, 700, and 800 respectively, of a data responder and a data requester, in which the data responder secures an opening to transmit. As before, in the diagrams 600, 700, and 800, station A is the media player 102 and station B is the LCD 104. However, in the diagrams 600, 700, and 800 station B owns the current SP or TXOP. Accordingly, station LCD 104 will issue RDGs to the media player 102.

Referring to FIG. 6, the LCD 104, during its SP/TXOP, sends a protocol data request 602 to the media player 102. The protocol data request 602 is bundled in a MPDU/A-MPDU 604 in which the RDG indicator bit is set, which indicates to the media player 102 that it may establish the reverse direction transmission right to respond to the LCD 104. The media player 102 recognizes the RDG due to the RDG bit being set, but, in the example shown in FIG. 6, does not yet have protocol response data in its TX buffer 314 ready to send.

Rather than giving up the reverse direction transmit opening, the media player 102 instead holds open the transmit opening. In particular, the media player 102 sends (if needed) a B/ACK 606 of the MPDU/A-MPDU 604, and transmits holding information until the protocol response data is ready to send. In this example, the media player 102 sends the holding information 608 and 610, by which time protocol response data 612 is ready in the TX buffer 314. Consequently, after transmitting the holding information 610, the media player 102 transmits the protocol response data to the LCD 104, e.g., in the form of a valid MAC frame 614. Through a MAC frame with suitable header 614, the media player 102 sets the More PPDU bit to 0, to indicate to the LCD 104 that the media player 102 is finished sending data during the RDG and that the LCD 104 may have the transmission right back. Some examples of MAC frames with suitable headers include HT (802.11n), QoS (802.11ad), and HT/VHT (802.11ac) headers, although other headers in other existing or future protocols may also be suitable.

Note also that, as described above, the media player 102 may decide upon the overall length of the responsive transmission 640 before or at the start of the responsive transmission 640. Under protocols that need the responsive transmission 640 to adhere to the overall length initially decided, the media player 102 may transmit additional holding information (e.g., the holding frames 642) to extend the responsive transmission 640 to reach the overall length that the media player 102 initially decided.

The LCD 104 may continue to issue requests for any data from the media player 102 during the SP/TXOP for the LCD 104. FIG. 6 shows a second example in which the LCD 104 sends a data request 616 and sets the RDG bit to 1. Again, the media player 102 does not have the response data yet available. Accordingly, rather than give the transmit opening back to the LCD 104 (e.g., by immediately ending the RDG), the media player 102 transmits, if needed, a B/ACK 618, followed by holding information 620, 622, 624, and 626 until the response data 628 is available. The media player sends the response data 628 to the LCD 104 when it becomes available, optionally followed by additional holding information 644 (e.g., to extend the transmission 646 to reach the decided upon length).

FIG. 7 continues the example of FIG. 6. FIG. 7 illustrates that the holding information may be one or more spacing delimiters. The spacing delimiters in the first response from the media player 102 are the spacing delimiters 702 and 704. Two of the spacing delimiters in the second response from the media player 102 are the spacing delimiters 706 and 708. The media player 102 may insert the spacing delimiters as desired to hold open the transmit opening in units of the granularity of the spacing delimiter.

The spacing delimiter is only one example of holding information. FIG. 8 shows another example in which the first response from the media player 102 uses NOP packets 802 and 804 as the holding information. In the second response, FIG. 8 shows that the media player 102 uses a mix of NOP packets (e.g., the NOP packet 806) and spacing delimiters (e.g., the spacing delimiter 808). As explained above, the media player 120 may sequence different holding information of different granularity as desired to extend the transmit opening until the response data is ready.

Figure 9:
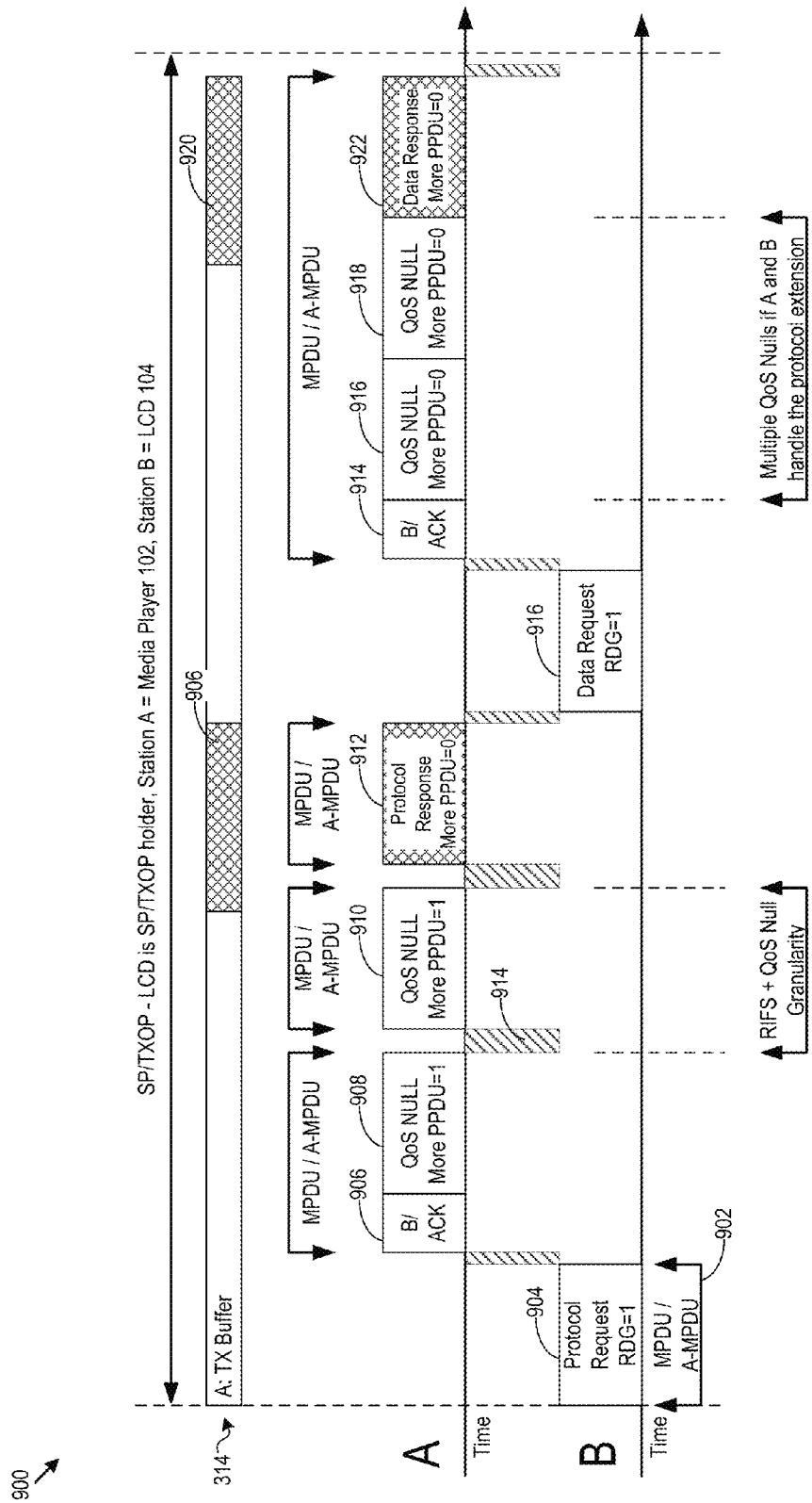
FIG. 9 shows an example communication diagram of a data responder and a data requester, in which the data responder secures an opportunity to transmit using QoS NULL packets.

FIG. 9 shows an example communication diagram 900 of a data responder and a data requester, in which the data responder secures an opportunity to transmit using QoS NULL packets as holding information. Although not illustrated in FIG. 9, note that as in the previous examples, the transmitting station may add holding information subsequent to response data to extend the transmission to reach a predetermined transmission length. The IEEE 802.11 standard defines, among other things, the QoS NULL packet and the QoS Data mentioned above. In FIG. 9, the LCD 104 is assumed to have the SP/TXOP, and grants a RDG to the media player 102 via the MPDU/A-MPDU 902 that includes a protocol data request 904. The response data 906 is not available in the TX buffer 314 at the time of the protocol data request 904. The media player 102 sends, if needed, a B/ACK 906 followed by a QoS NULL packet 908, with More PPDU set to 1 to indicate that the media player 102 has more packets to send. In some protocols, a single QoS NULL packet 908 is permitted per MPDU/A-MPDU. Thus, the media player 102 may continue to send MPDUs/A-MPDUs with a QoS NULL packet until the response data 906 is available.

In the first example in FIG. 9, the media player sends a second QoS NULL packet 910, after which the response data 906 is available. The media player 102 sends the response data 910 in the response frame 912, e.g., a QoS Data frame. In some protocols, each unit of data transfer (e.g., the MPDU or A-MPDU) is separated from other units of data transfer by a spacing interval 914. For example, the spacing interval 914 may be a Reduced Interframe spacing (RIFS) time. Accordingly, the granularity of the QoS NULL holding information may be the RIFS time plus the duration of a QoS NULL packet.

Despite that some protocols allow a single QoS NULL packet 908 per MPDU/A-MPDU, any set of stations may extend any particular protocol by handing multiple QoS NULL packets per MPDU/A-MPDU (or any other unit of data transfer). For example, transceivers manufactured by a common manufacturer or collaboration of manufacturers may be configured to handle extensions to a protocol in an agreed upon manner. Then, when a data sender with a transceiver manufactured by a particular manufacturer is in communication with a data receiver with a transceiver manufactured by the same manufacturer, the data sender and data receiver may extend the protocol in pre-determined manner, such as by allowing multiple QoS NULL packets per MPDU/A-MPDU.

FIG. 9 shows a second example of a response from the media player 102. In the second example, the media player 102 sends, if needed, a B/ACK 914 to the data request 916. In addition, the media player 102 sends multiple QoS NULL packets 916 and 918 until the response data 920 is ready. When the response data 920 is ready, the media player 102 sends the response data 920 to the LCD 104 in, for example, a QoS Data frame 922.

Figure 10:
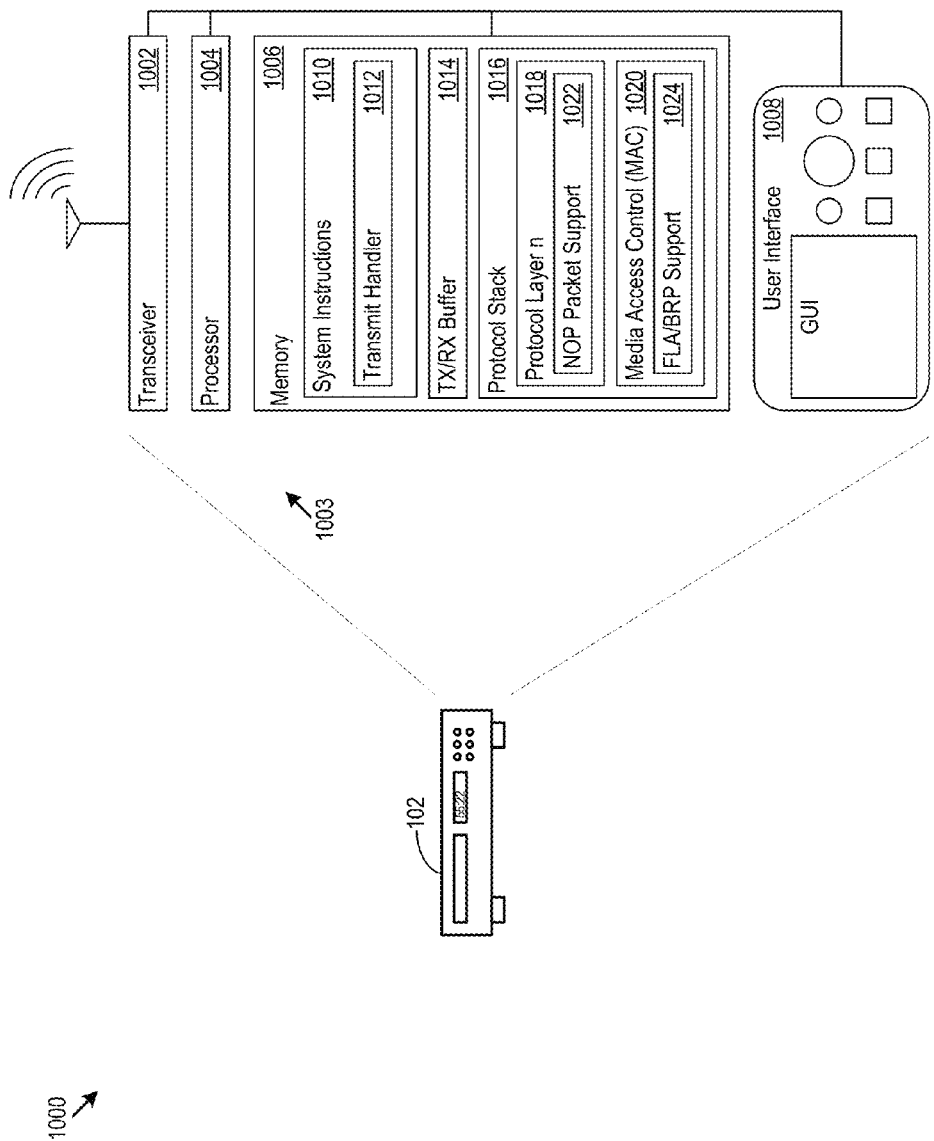
FIG. 10 shows an example of a station.

FIG. 10 shows an example implementation of a station 1000, in this instance the media player 102. The station 1000 includes a transceiver 1002 and system logic 1003 in communication with the transceiver 1002. The system logic 1003 may be implemented in hardware, software or both. In one implementation, the system logic 1003 includes one or more processors 1004, a memory 1006, and a user interface 1008. The transceiver 1002 may be wireless transceiver, and the transmitted and received signals may adhere to any of a diverse array of formats, protocols, modulations, frequency channels, bit rates, and encodings that presently or in the future may support reverse direction protocols. Thus, the transceiver 1002 may support the 802.11a/b/g/n/ac standards, the 60 GHz WiGig/802.11TGad specification, Bluetooth, Global System for Mobile communications (GSM), Time Division Multiple Access (TDMA), Frequency Division Multiple Access (FDMA), Code Division Multiple Access (CDMA), or other wireless access techniques or protocols.

The processor 1004 executes the system instructions 1010. The system instructions 1010 may include an operating system, application programs, device firmware, or other instructions. The system instructions 1010 include a transmit handler 1012. The transmit handler 1012 may implement the processing noted above and described below with respect to FIG. 11 with respect to holding open transmit openings using holding information. For example, the transmit handler 1012 may receive a data request and optionally a RDG, recognize that the TX buffer 1014 does not yet hold response data for a protocol data request, and instead of releasing the transmit opening, may instead transmit holding information until the response data becomes available.

The station 100 may implement one or more protocol stacks 1016, and any protocol stack may be organized into one or more layers. In the example in FIG. 10, the protocol stack 1016 shows, generally, an 'nth' stack layer 1018 and, as a specific example, a media access control (MAC) layer 1020. The protocol stack 1016 may implement one or more of the WBE, WSE, WDE, WSD, FLA, and BRP protocols across one or more of the layers of the protocol stack 1016. For example, the MAC layer 1020 may implement the 802.11ad FLA or BRP protocols. The protocol stack 1016 may support certain types of packets at any one or more of the layers of the protocol stack 1016. In some implementations of the protocol stack 1016, the protocol stack 1016 includes NOP packet support 1022, or support for any other type of packet that may respond to a data request without actually returning the requested data that is responsive to the data request. Said another way, the protocol stack 1016 may support packets that providing holding information. As noted above, the holding information may allow a station to extend a transmit opening until response data is available to meet a particular data request.

Figure 11:
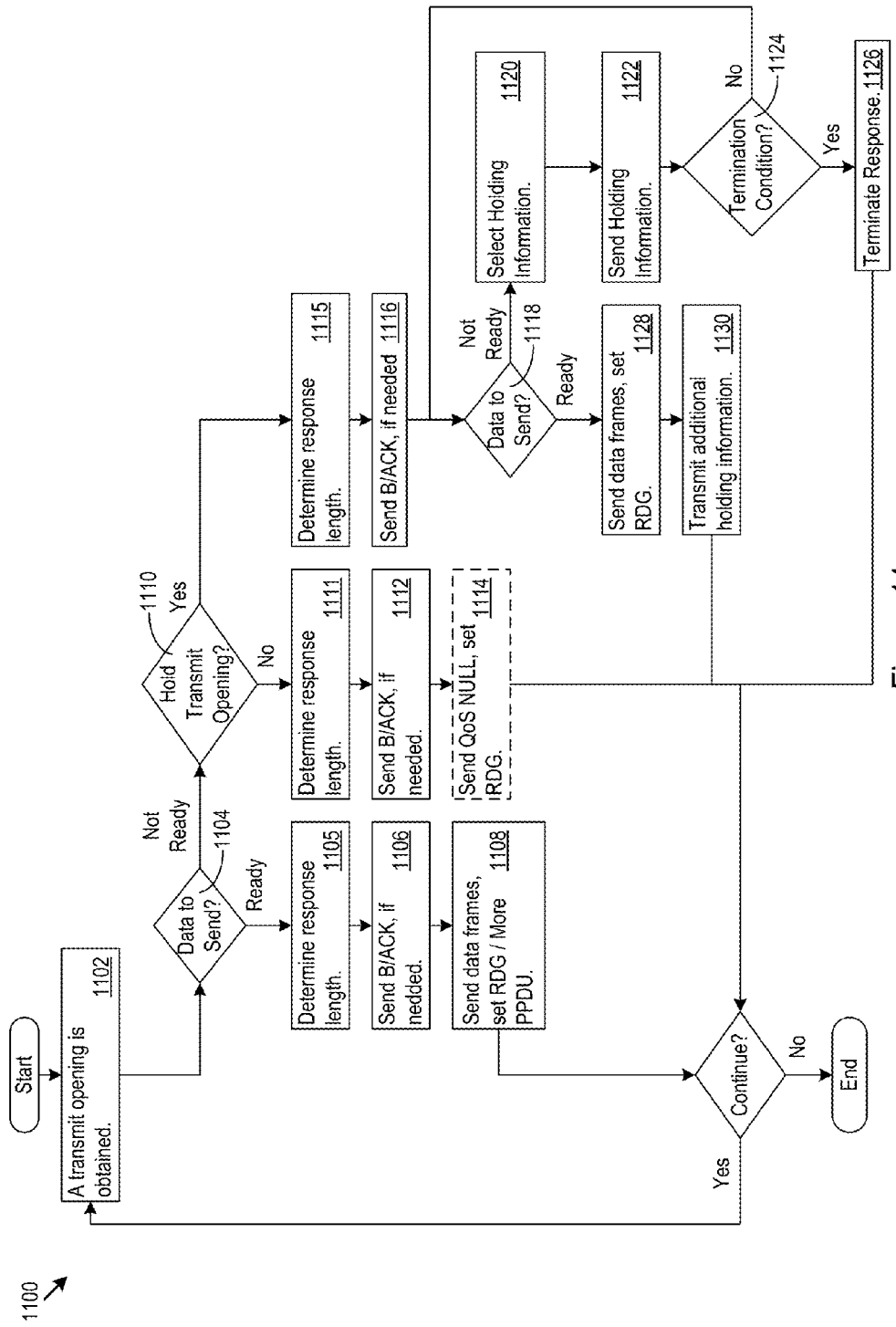
FIG. 11 shows a flow diagram of logic for securing transmit opportunities.

FIG. 11 shows a flow diagram of logic 1100 for holding a transmit opening. The transmit handler 1012 may implement the logic 1100 in hardware or software, for example. At any given point in time, a station may obtain a transmit opening (1102). The station with the transmit opening may be the station that owns the SP/TXOP or may not be the station that owns the SP/TXOP. The transmit opening may arise as a result of obtaining the transmission right from a RDG, as one example. As another example, the transmit opening arise in many other situations, such as from simply owning the current TXOP/SP. For any transmit opening, the station may communicate any desired data, including response data to a protocol request or data not responsive to any protocol request.

The logic 1100 may determine whether data (e.g., protocol response data) is ready to send (1104) during the transmit opening. When data is ready, the logic 1100 may determine the length of the response (1105) (e.g., the PSDU length) and with the response send a B/ACK of the data request (1106), if needed, along with the response data in data frames, management frames, or other types of frames (1108). When the station owns the SP/TXOP, the station may set the RDG bit to 1 to give a reverse direction grant to another station, or set the RDG bit to 0 to retain the transmission right. When the station does not own the SP/TXOP, then the responding station may instead set More PPDU to 0 to indicate that the sending station has no more data to send.

In the case that there is no data ready to send (1104), then the logic 1100 may determine whether or not it will extend the transmit opening until data is ready (1110). If for any reason the station decides that it will not hold the transmit opening, then the station may determine the response length (1111), and send a B/ACK of the data request (1112) if needed. In addition, if the station owns the SP/TXOP, then the logic 1100 may send a QoS NULL packet and set RDG according to whether the station will offer a RDG to another station. The logic 1100 sends B/ACKs according to whether the protocol expects B/ACKs. For example, the logic 1100 may send the B/ACKs when following the 802.11ad protocol. For 802.11n/ac, however, the logic 1100 may not send B/ACKs, and may instead send a control wrapper frame with RDG set (e.g., to 1). If the station does not own the SP/TXOP, then the responding station may choose not to transmit anything, and the transmission right may then automatically revert to the granting station after a predetermined time interval, such as the PCF Interframe Space (PIFS) time.

In the case that data is not ready to send (1104) and the logic 1100 decides to hold the transmit opening (1110), then the logic 1100 may determine an overall response length (1115) that takes into account the duration of the anticipated or expected amount of holding information, the duration to transmit the anticipated or estimated amount of response data, the duration to transmit acknowledgements if needed, and to transmit any other information that will be sent in the response transmission. In its response, the logic 1100 sends a B/ACK of the data request if needed (1116). As long as the data is not yet ready to send (1118), the logic 1100 may select holding information (1120) and send the holding information (1122). The holding information may be, for example, one or more NOP packets, spacing delimiters, QoS NULLs, or other holding information, in any sequence or combination.

Note, however, that the overall response length may constrain the amount of holding information that may be sent. Furthermore, the length of the transmit opening (e.g., the maximum length of the SP/TXOP) may also constrain the length of the response transmission. Under either condition (or other termination conditions), the logic 1100 may also determine that the transmit opening must end (1124). In that case, the logic 1100 may terminate its response (1126) and release the transmission right.

When the data becomes available (1118), the logic 1100 may transmit the data (1128), along with any additional subsequent holding information desired or needed to extend the response length to meet the initially specified overall response length (1130). In addition, when the station owns the SP/TXOP, the station may set the RDG bit to 1 to give a reverse direction grant to another station, or set the RDG bit to 0 to retain the transmission right. When the station does not own the SP/TXOP, then the responding station may instead set More PPDU to 0 to indicate that the sending station has no more data to send.

Figure 12:
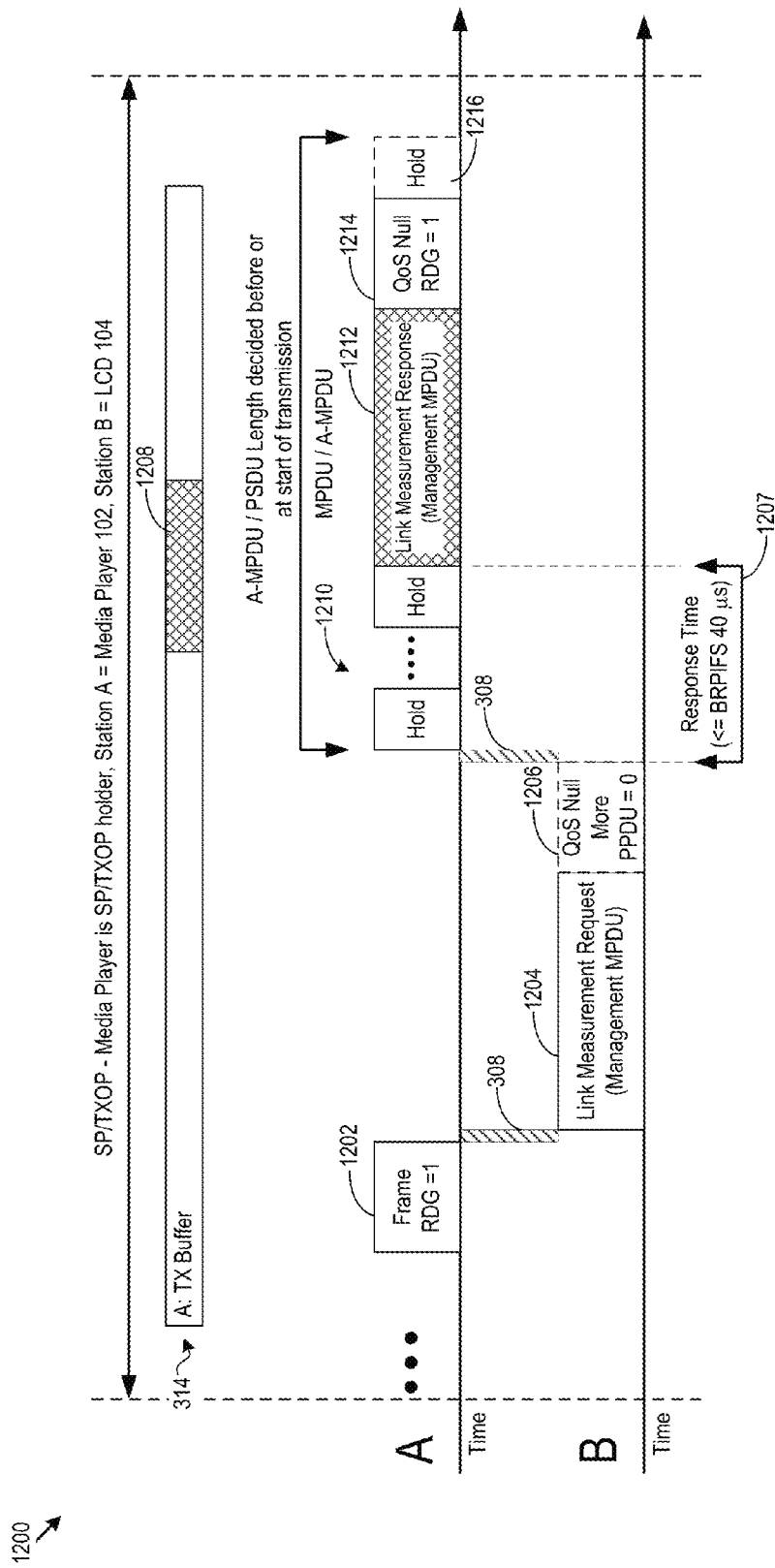
FIG. 12 shows an example communication diagram for responding to a fast a link adaptation request with low latency.

FIG. 12 shows an example communication diagram 1200 for responding to a fast a link adaptation (FLA) request with low latency. In the example diagram 1200, the media player 102 is assumed to hold the SP/TXOP. The media player 102 grants a reverse direction right by sending the frame 1202 in which the RDG bit is set. The media player 102 thereby gives the LCD 104 the transmission right. The LCD 104 transmits a link measurement request 1204, which can be for example, a management MPDU. In this example, a QoS Null frame 1206 follows, that sets More PPDU to 0 to indicate that the LCD 104 is done transmitting.

The media player 102 sends a response to the FLA request after the response time 1207, measured from the end of the FLA request. Under some communication standards, the LCD 104 may be required to respond no later than a certain maximum time, such as the BRPIFS time, defined as 40 µs. However, the maximum response time may be different in other standards. With regard to the example in FIG. 12 and FIG. 13, the LCD 104 expects the media player 102 to send the link measurement response 1212 after at least the SIFS 308, but before the end of the BRPIFS time. Note that when the FLA request was received, the media player 102 did not have response data 1208 to send. However, rather than giving the transmission right back to the LCD 104 and possibly losing the chance to respond to the FLA request in the allotted response time, the media player 102 started sending holding information 1210. The holding information 1210 may be spacing delimiters, or any other type of holding information.

Once the response data 1208 becomes available, the media player 102 transmits the response data 1208 as, e.g., a link measurement response 1212. The media player 102 may also send a frame 1214 that specifies whether the transmission right will be given back to the LCD 104, as well as any additional holding information 1216. The additional holding information 1216 may extend the transmission by the media player 102 to reach the pre-decided length of the PSDU.

Figure 13:
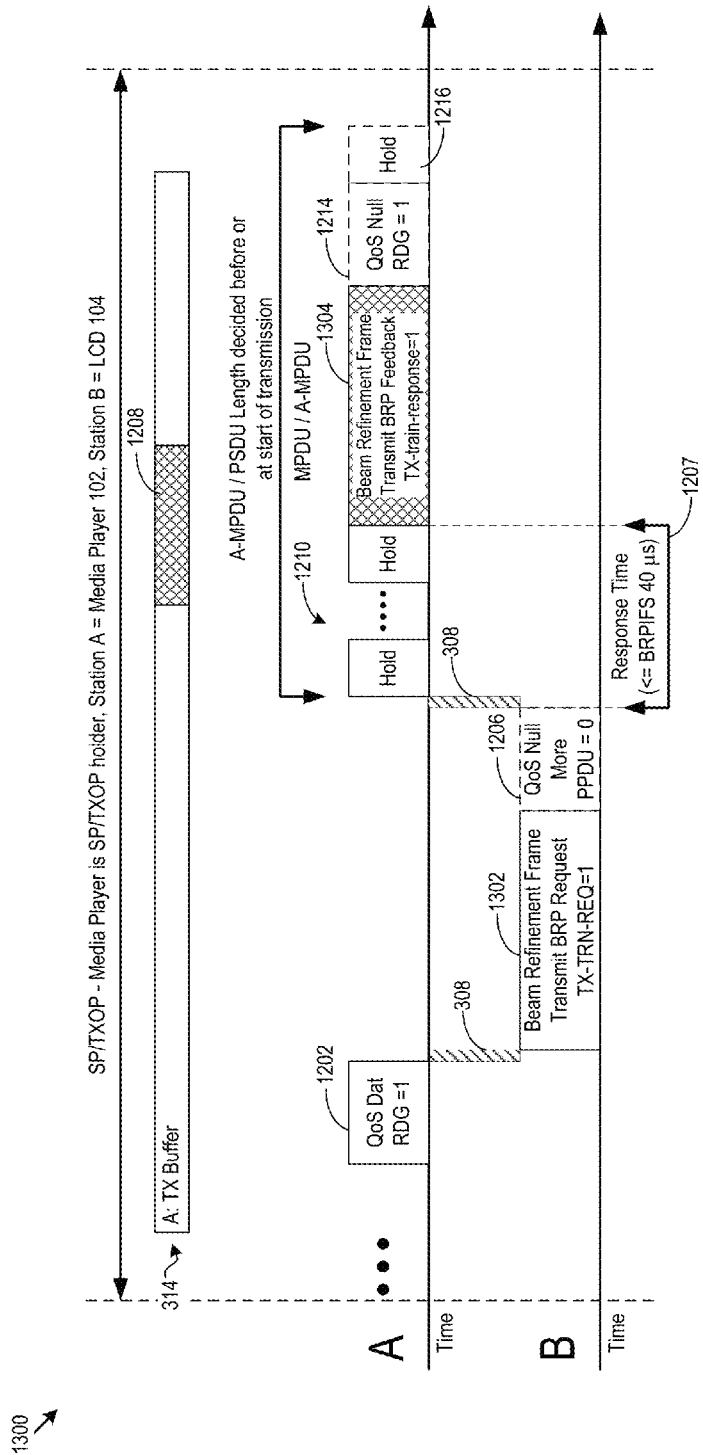
FIG. 13 shows an example communication diagram for responding to a beam refinement protocol request with low latency.

FIG. 13 shows an example communication diagram 1300 for responding to a beam refinement protocol request with low latency. The example communication diagram 1300 follows a similar message exchange sequence as shown in FIG. 12. However, in FIG. 13, the LCD 104 communicates a beam refinement frame 1302, indicating request for transmit or receive training (the scenario shown in FIG. 13 is request for transmit training, but it could also be request for receive training). The beam refinement frame 1302 may be part of the BRP described above. Because the media player 102 does not have the response data 1208 available for transmission within the allotted response time, the media player 102 instead transmits holding information 1210. When the response data 1208 becomes available, the media player 102 sends the response data back to the LCD 104 as a beam refinement response frame 1304. Again, the media player 102 may also send a frame 1214 that gives the transmission right back to the LCD 104 (or any other station), as well as additional holding information 1216 to extend the length of the transmission to a pre-decided length.

Figure 14:
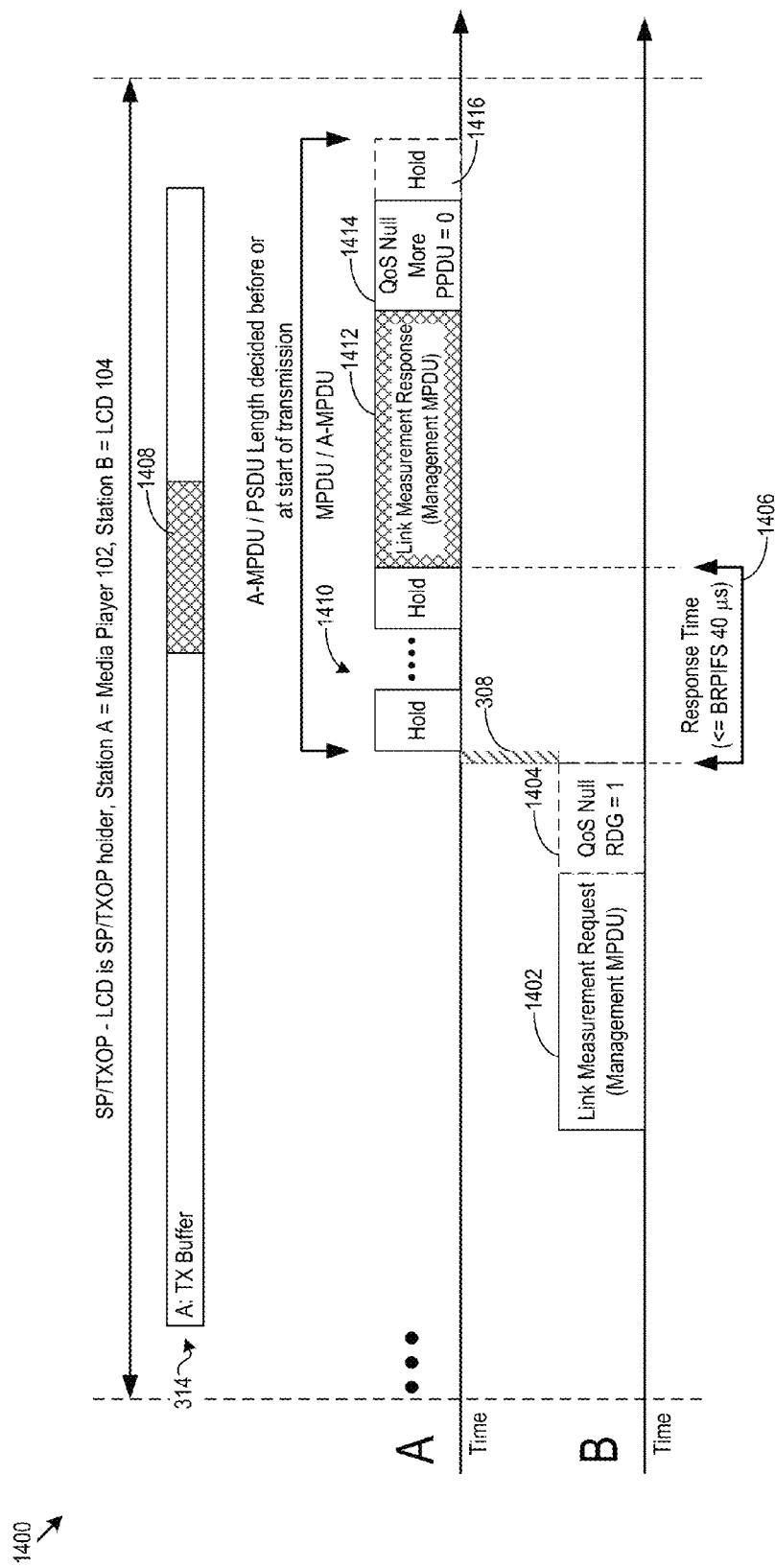
FIG. 14 shows a second example communication diagram for responding to a link adaptation request with low latency.

FIG. 14 also shows an example communication diagram 1400 for responding to a fast a link adaptation (FLA) request with low latency. In the example diagram 1400, the LCD 104, rather than the media player 102, is assumed to hold the SP/TXOP. The LCD 104 transmits a link measurement request 1402, which can be for example, a management MPDU, and grants a reverse direction right by sending a frame 1404 (e.g., a data MPDU or a QoS Null frame) in which the RDG bit is set.

The media player 102 sends a response to the FLA request after the response time 1406, measured from the end of the FLA request. In this example, the response time is less than or equal to the BRPIFS time, defined as 40 µs. Note that the station may respond sooner than the BRPIFS time (or sooner than any other predetermined maximum response time). When the FLA request was received, the media player 102 did not have response data 1408 to send. However, rather than giving the transmission right back to the LCD 104 and possibly losing the chance to respond to the FLA request in the allotted response time, the media player 102 started sending holding information 1410. The holding information 1410 may be spacing delimiters, or any other type of holding information.

Once the response data 1408 becomes available, the media player 102 transmits the response data 1408 as, e.g., a link measurement response 1412. The media player 102 may also send a frame 1414 that specifies that the media player 102 is done transmitting, as well as any additional holding information 1416. The additional holding information 1416 may extend the transmission by the media player 102 to reach the pre-decided length of the PSDU.

Figure 15:
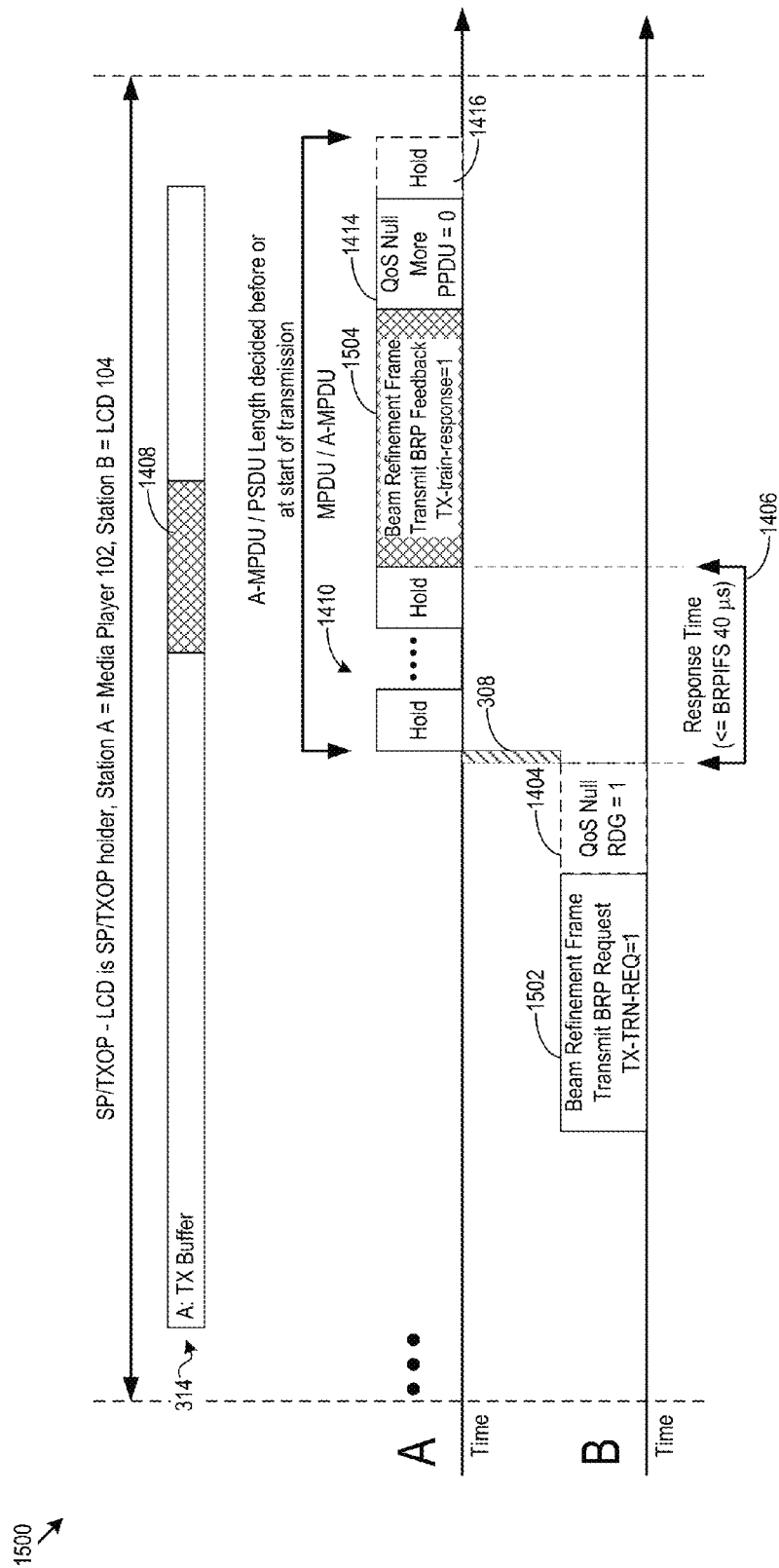
FIG. 15 shows a second example communication diagram for responding to a beam refinement protocol request with low latency.

FIG. 15 shows an example communication diagram 1500 for responding to a beam refinement protocol request with low latency. The example communication diagram 1500 follows a similar message exchange sequence as shown in FIG. 14. However, in FIG. 15, the LCD 104 communicates a beam refinement frame 1502, indicating request for transmit or receive training (the scenario shown in FIG. 15 is request for transmit training, but it could also be request for receive training). The beam refinement frame 1502 may be part of the BRP described above. Because the media player 102 does not have the response data 1408 ready for transmission, the media player 102 instead transmits holding information 1410. When the response data 1408 becomes available, the media player 102 sends the response data 1408 back to the LCD 104 as a beam refinement response frame 1504. Again, the media player 102 may also send a frame 1414 that gives the transmission right back to the LCD 104 (or another device), as well as additional holding information 1416 to extend the length of the transmission to a pre-decided length.

The discussion above noted a station may decide upon an overall length for an A-MPDU/Physical Layer Service Data Unit (PSDU) to transmit. The overall length may include the length of the anticipated or estimated protocol response, the anticipated or estimated amount of holding information, B/ACK, and other components of the response. The overall length may be included in the PPDU header sent with the transmission, e.g., under the 802.11 protocol. Furthermore, the station may transmit additional holding information after transmission of any response data to extend a transmission to reach the overall length initially determined for the transmission.

Accordingly, any station may estimate a duration for its transmission during a transmit opening that the station may need in order to respond. The estimation process may take into consideration any protocol specific requirements. For example, if the response time must be less than 40 microseconds, then the estimation process may allow the transmit opening to extend for at least the response time to allow the station the full opportunity in which to respond. Furthermore, the estimation process may take into consideration statistical information concerning the availability of response data and the amount of response data. Such statistical information may be stored in the memory 1006 and may include, as examples, average, expected, or mean time to obtain response data, and the average, expected, or mean length of response data. The statistical information may be maintained by the station for any particular type of protocol or for any particular type of request for any particular protocol, may be communicated to the station from another source of such statistical data, or may be provided to the station in any other manner. Thus, as one specific example, when the station estimates that it will take 100 µs to obtain the response data and that there is 300 µs of response data to send (including frame overhead), then the station may estimate the transmission length to be 400 µs.

The station may further consider the granularity of any desired holding information in the estimation. To continue the example, if the holding information granularity is 15 µs, then the station may estimate sending seven units of holding information (105 µs) while awaiting the 300 µs of response data to become available. The predetermined estimated transmission length may then be at least 405 µs.

The discussion below describes ways in which the protocol requester (e.g., the station that transmits the protocol request) may provide additional time for the data responder to obtain and transmit data that is responsive to the protocol request.

Figure 16:
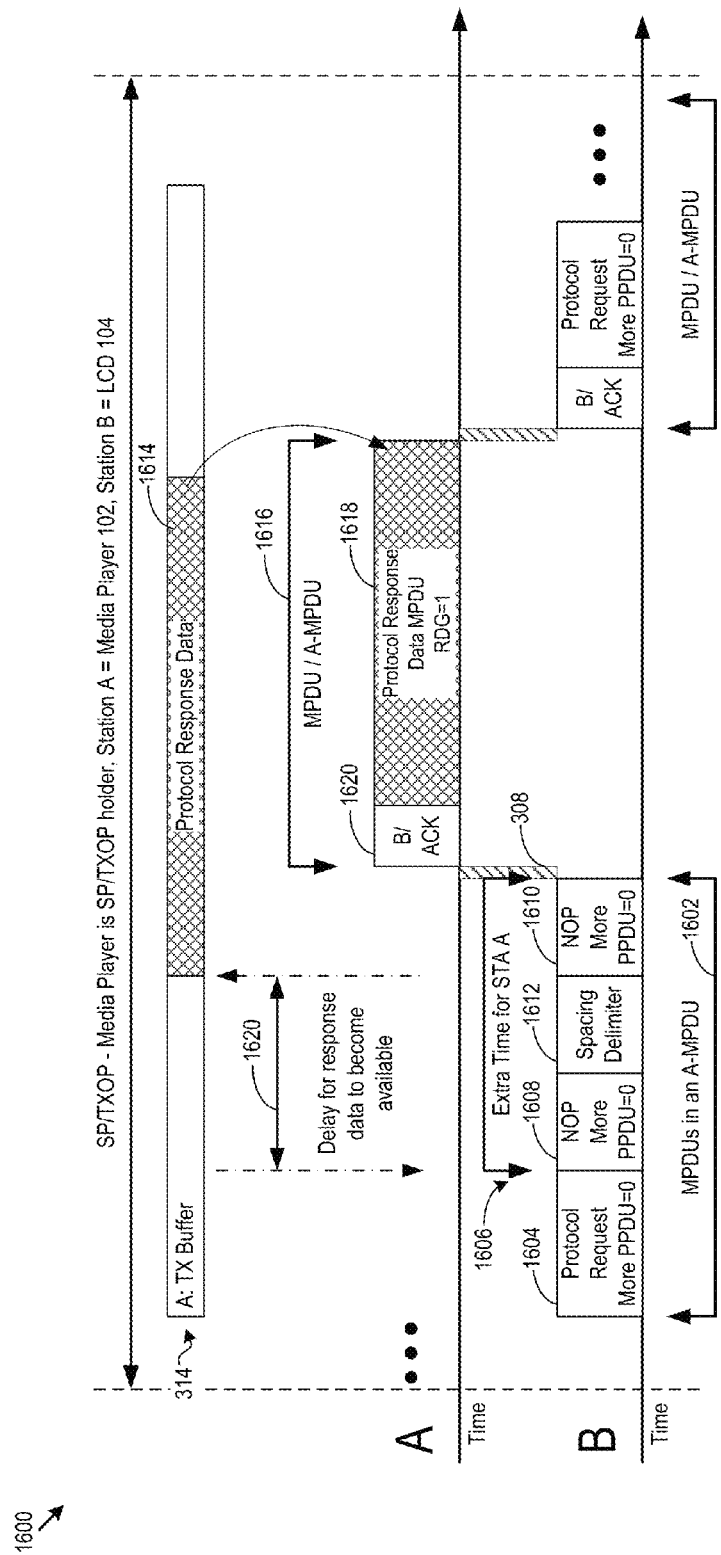
FIG. 16 shows an example communication diagram for how a protocol data requester (that does not own the transmit opportunity) may provide additional time for a protocol data responder to communicate responsive data.

FIG. 16 shows an example communication diagram 1600 for how a protocol data requester that does not own the transmit opportunity may provide additional time for a protocol data responder to communicate responsive data. In particular, station B is the data requester and has received a RDG from station A. The station B, during its transmit opportunity, sends the A-MPDU 1602.

Note that the A-MPDU 1602 includes a MPDU that carries a protocol request 1604 to the station A. Note also that the station B has extended its transmit opportunity using holding information 1606 sent after the protocol request 1604. The holding information may be implemented in many different ways. The example of FIG. 16 shows that the holding information includes the NOP packets 1608 and 1610, as well as a spacing delimiter 1612.

As noted above, the spacing delimiter may be implemented as an 802.11 MPDU delimiter with the MPDU length field set to zero, resulting in a unit of information that includes 32 bits of header information and no payload. The granularity of such a spacing delimiter is 32 bits or 4 bytes. However, the techniques described in this document may employ any other implementation of a spacing delimiter, such as a delimiter of variable length.

The NOP packets, spacing delimiters, and any other holding information may appear in any order and number, to create additional time for the data responder to obtain and respond with the requested protocol data. As shown in FIG. 16, the additional time given to the data responder has allowed the protocol response data 1614 to become available to the data responder for preparing and sending its protocol response at its next transmit opening. More specifically, the data responder needs to respond quickly after the end of the A-MPDU 1602 so that it does not lose the opportunity to respond and therefore wait until its next transmit opportunity. As shown in FIG. 16, due to the additional time given by the extended A-MPDU 1602, the data responder has the protocol response data 1614 available when the A-MPDU 1602 ends. In other words, the holding information 1606 has covered the delay time 1620 needed by the data responder to obtain the response data.

As a result, the data responder may immediately create and send its responsive communication (e.g., in an MPDU/A-MPDU 1616). The responsive communication conveys all or part of the protocol response data 1614 to the data requester (e.g., in an MPDU 1618). The responsive communication 1616 may include a B/ACK 1620 if needed or desired.

Note that the stations may process information at the MPDU level. Therefore, the data responder may begin obtaining the responsive data after it has received the MPDU with the protocol request 1604. The data responder does not need to wait until the A-MPDU 1602 has finished.

Figure 17:
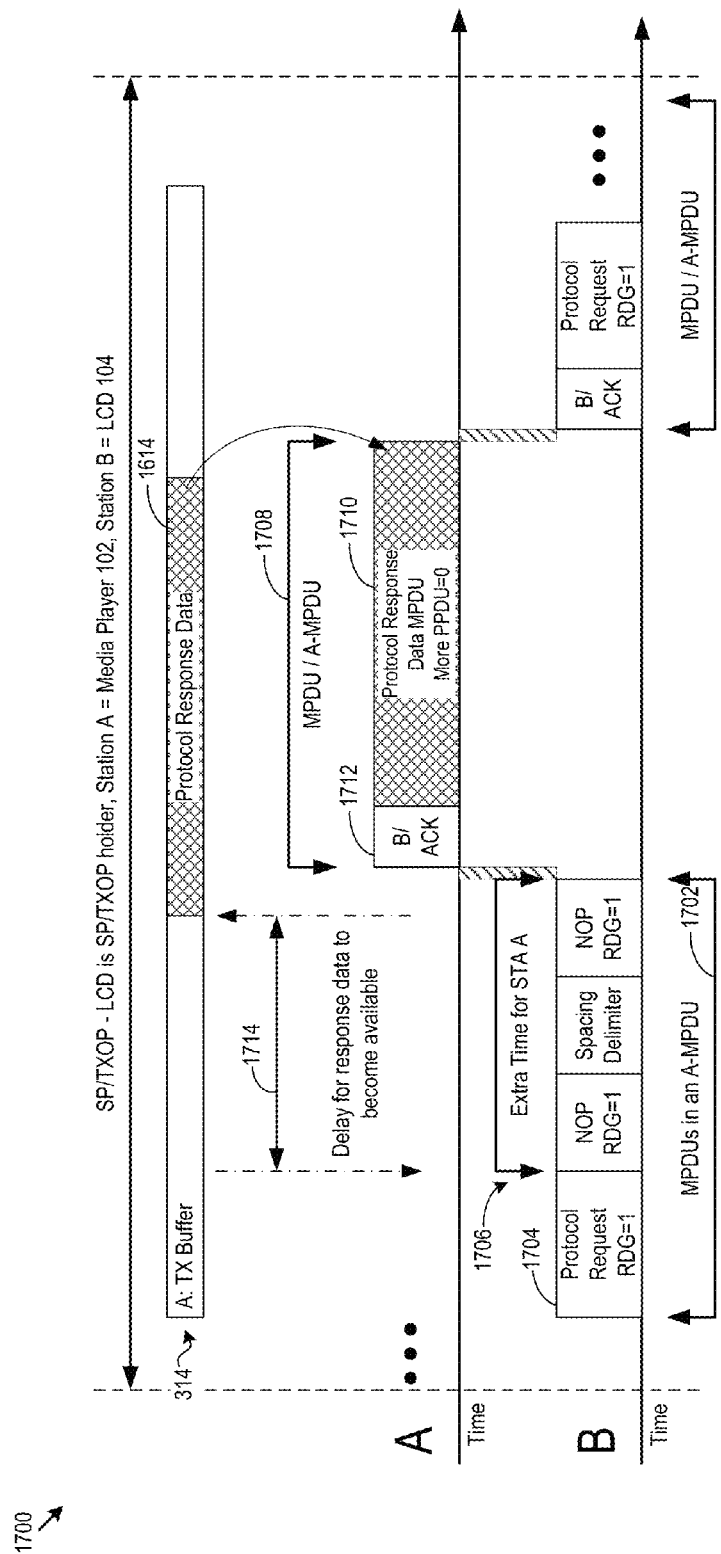
FIG. 17 shows an example communication diagram for how a protocol data requester (that does own the transmit opportunity) may provide additional time for a protocol data responder to communicate responsive data.

FIG. 17 shows an example communication diagram 1700 for how a protocol data requester (that does own the transmit opportunity) may provide additional time for a protocol data responder to communicate responsive data. In FIG. 17, the data requester sends the A-MPDU 1702. The A-MPDU 1702 includes the protocol request 1704 and a RDG to allow the data responder to send its responsive data during the transmit opportunity owned by the data requester.

The A-MPDU 1702 further includes holding information 1706. As noted above, the holding information extends the duration of the A-MPDU transmission from the data requester. The extension gives the data responder additional time to obtain the protocol response data 1614, and respond without the need to wait for a future transmission opportunity. In other words, the holding information 1706 has consumed at least part of the delay 1714 for the data responder to obtain the response data (and in this example, all of the delay 1714). Accordingly, when the A-MPDU 1702 ends, the data requester may immediately respond with an A-MPDU 1708 that includes, for example, an MPDU 1710 with the response data, and a B/ACK 1712.

Figure 18:
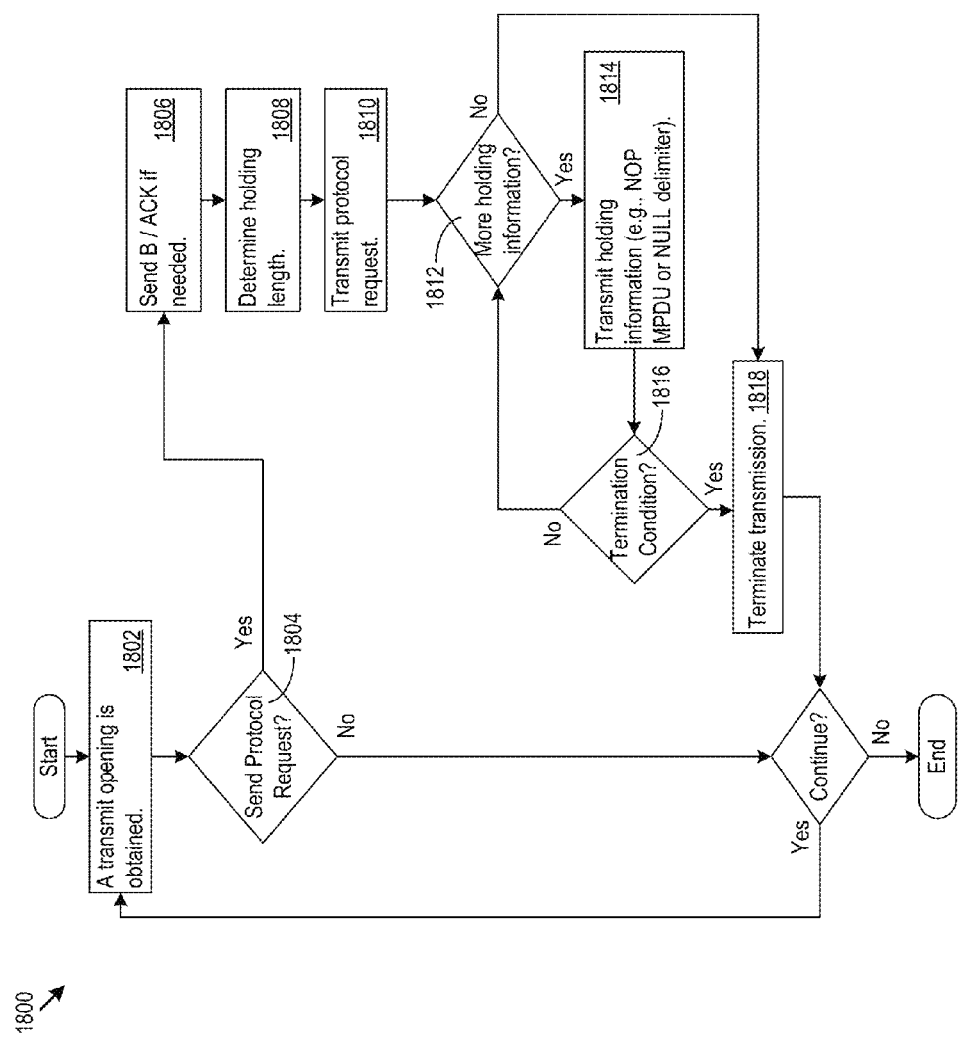
FIG. 18 shows an example flow diagram of logic for providing a protocol data responder with additional time to respond to a protocol data request.

FIG. 18 shows an example flow diagram of logic 1800 for providing a protocol data responder with additional time to respond to a protocol data request. A data requester obtains a transmit opening (1802). The transmit opening may result from a RDG, or from a scheduled TXOP, as examples. The data requester determines whether to send a data request (1804). If so, the data requester prepares it transmission that includes the data request.

In particular, the data requester may transmit a B/ACK if needed or desired (1806), for example to acknowledge a RDG. The data requester may then determine the length of holding information, if any, that will extend the transmission (1808). Techniques for determining the holding information length are described in more detail below.

The data requester sends the data request (1810), e.g., in a MPDU in an A-MPDU. The data requester then determines whether to send holding information (1812). If so, the data requester sends selected holding information (1814), such as one or more NOP packets or spacing delimiters. The data requester may continue to add holding information to its transmission, until the length of the holding information has been reached, or until a termination condition is reached (1816). The termination condition may be, for example, that the data requester cannot hold the transmit opening any longer and so must terminate its transmission (1818).

Figure 19:
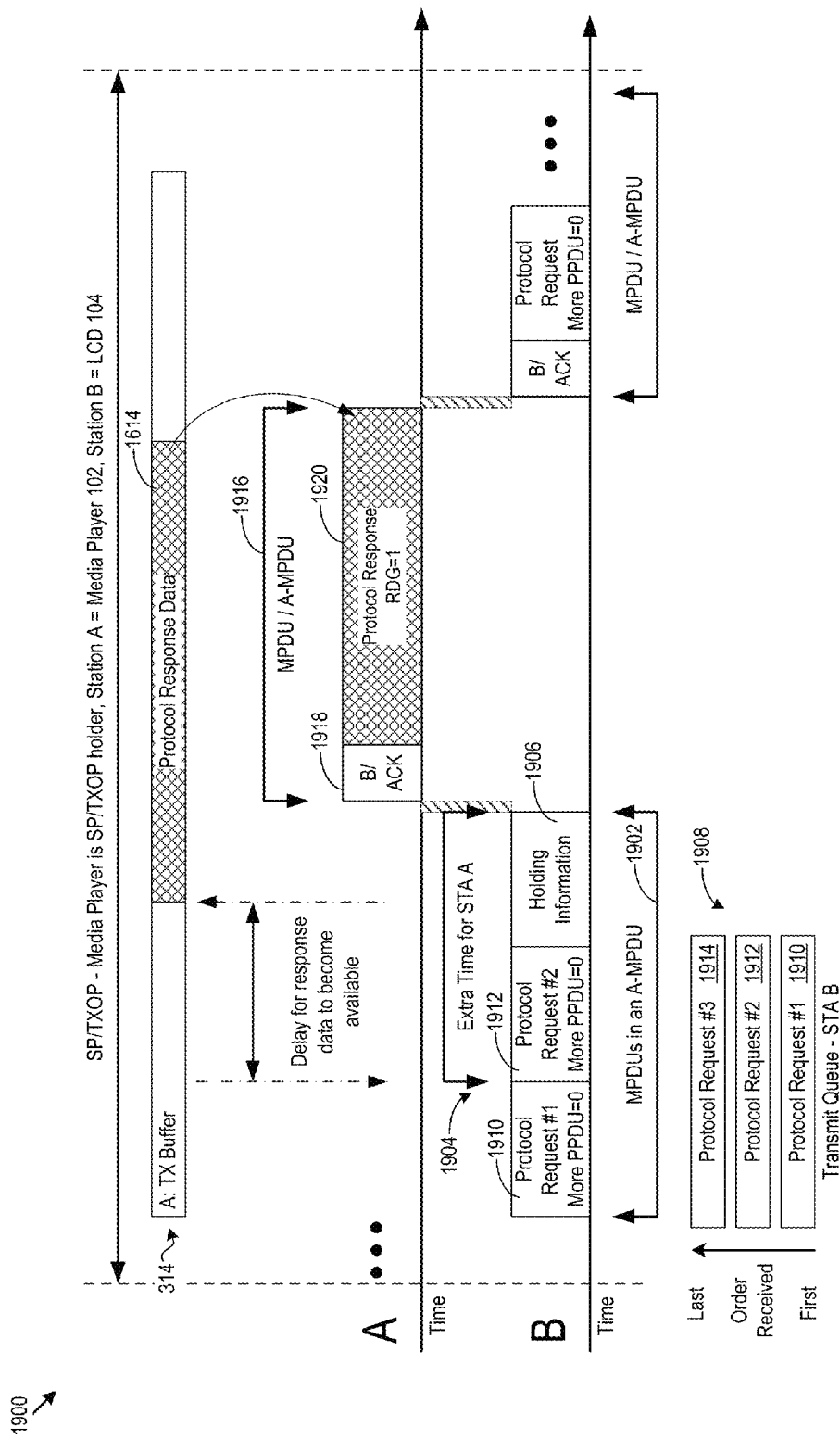
FIG. 19 shows an example communication diagram for how a protocol data requester (that does not own the transmit opportunity) may provide additional time for a protocol data responder to communicate responsive data by transmitting additional protocol requests and other holding information.

FIG. 19 shows an example communication diagram 1900 for how a protocol data requester (that does not own the transmit opportunity) may provide additional time for a protocol data responder to communicate responsive data. Here, the data requester has received a RDG from another station. In this example, the data requester transmits additional protocol requests as holding information, and may do so in addition to transmitting other holding information such as NOP packets and spacing delimiters as described above.

In FIG. 19, the data requester sends an A-MPDU 1902 that includes protocol requests 1904 and additional holding information 1906. The data requester maintains a transmit queue 1908. The transmit queue 1908 may, at any time, hold one or more protocol data requests. FIG. 19 shows three such protocol data requests 1910, 1912, and 1914 in the queue, and their order of arrival. There may be additional or fewer such requests in the transmit queue 1908 at any given time. As before, data responders communicate responsive protocol data back to the data requester, e.g., in an A-MPDU 1916 that includes (if needed) a B/ACK 1918 and an MPDU 1920 that holds the responsive data.

The data requester may at any given interval analyze the transmit queue 1908 and determine that there are multiple protocol data requests queued up in the transmit queue 1908. Accordingly, the data requester may send one or more additional protocol requests to extend the duration of its transmission. Said another way, the holding information need not be only NOP packets or spacing delimiters, but may include actual queued data packets for transmission. In FIG. 19, the station that will respond to the protocol data request 1910 has the additional time to respond given by the time taken to transmit the protocol data request 1912 and the holding information 1906. Similarly, the station that will respond to the protocol data request 1912 has the additional time to respond given by the time taken to transmit the holding information 1906.

The data requester may enforce any desired transmit policies over transmitting additional data from the transmit queue 1908. As examples, the data requester may transmit protocol requests in any number and order, or may adhere to pre-configured transmit rules, for example, to transmit protocol requests in the order queued in the transmit queue 1908. As another example of transmit rules, the data requester may transmit protocol data requests that immediately follow in sequence with the first protocol data request that is sent from the transmit queue 1908, and may change to other types of holding information when other data comes between two protocol requests in the transmit queues 1908.

Figure 20:
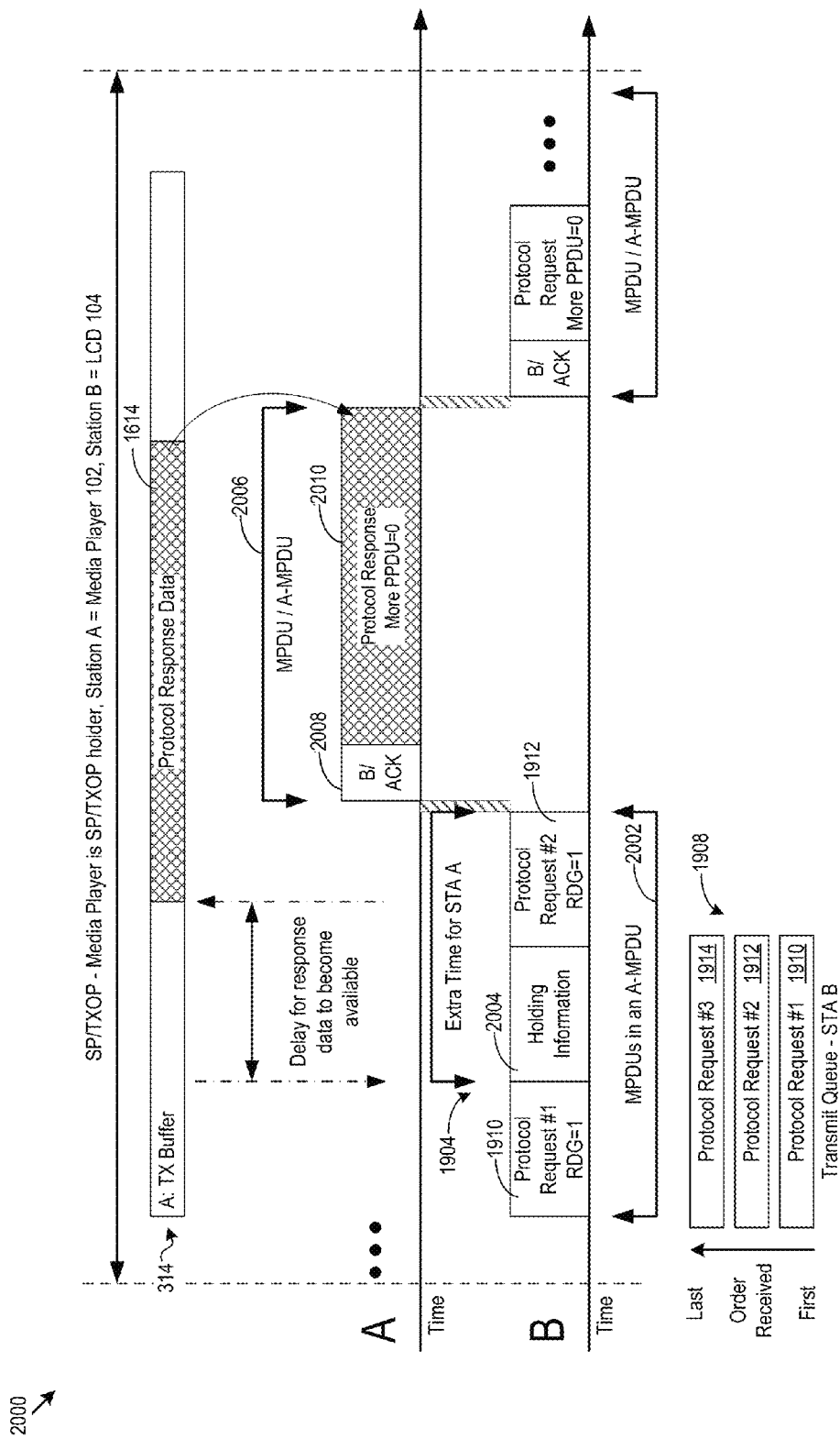
FIG. 20 shows an example communication diagram for how a protocol data requester (that does own the transmit opportunity) may provide additional time for a protocol data responder to communicate responsive data by transmitting additional protocol requests and other holding information.

FIG. 20 shows an example communication diagram 2000 for how a protocol data requester (that does own the transmit opportunity) may provide additional time for a protocol data responder to communicate responsive data by transmitting additional protocol requests and other holding information. Here, the data requester owns the transmit opening, and gives a RDG to the data responder. This example follows the example of FIG. 19, but shows that the A-MPDU 2002 includes the protocol request 1910, followed by holding information 2004, followed by the protocol request 1912. Also, in each MPDU with a protocol request, the RDG bit may be set to offer a data responder the chance to transmit responsive data.

In this example, the holding information 2004 and the protocol data request 1912 provide additional time for the data responder to the protocol data request 1910 to obtain the requested response data. The data responder that will respond to the protocol data request 1912 does not have any additional response time provided by the A-MPDU 2002 transmission, however. A data responder may respond, for example, with an A-MPDU 2006 that includes (if needed) a B/ACK 2008 and an MPDU 2010 with the responsive data.

Figure 21:
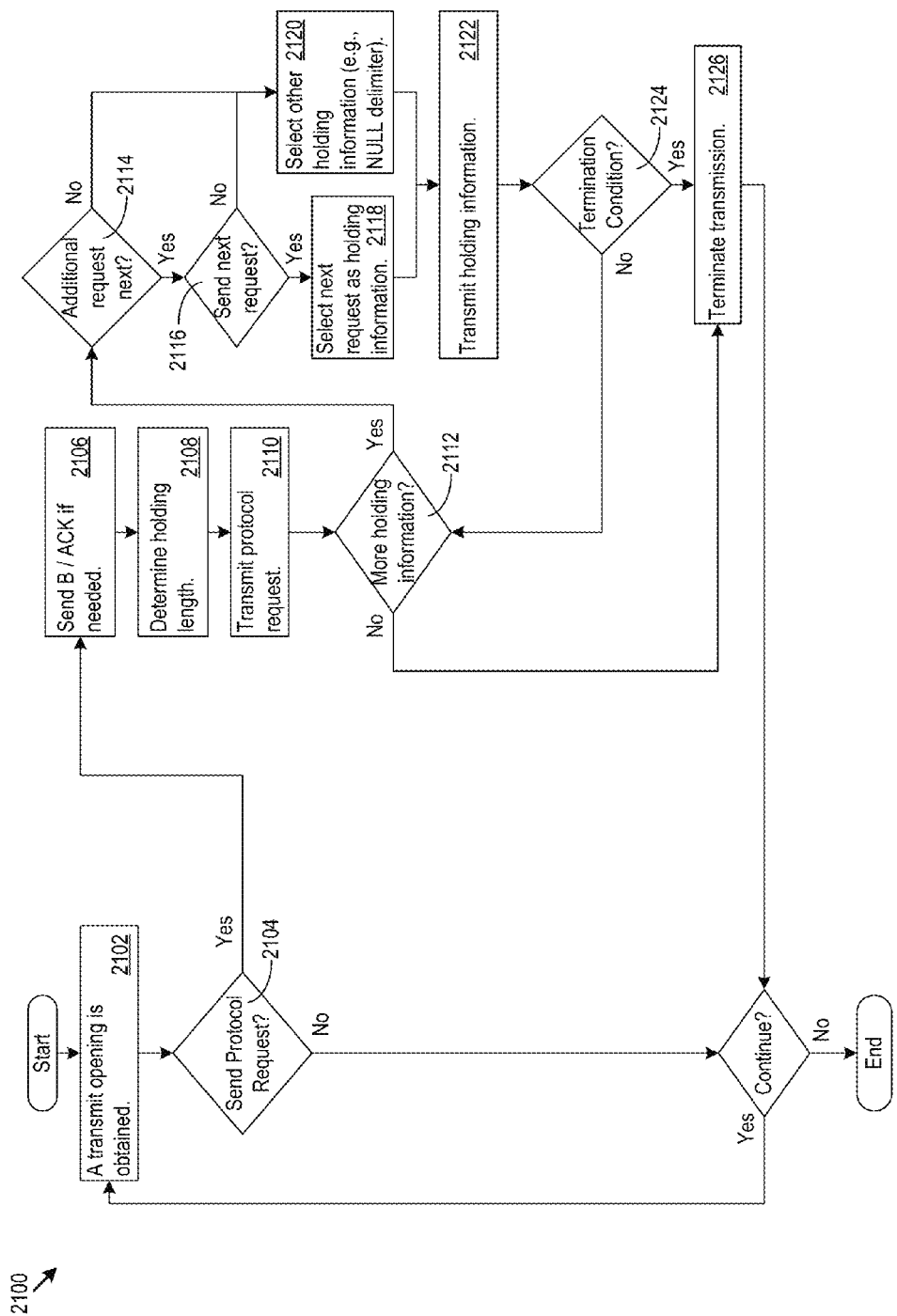
FIG. 21 shows an example flow diagram of logic for providing a protocol data responder with additional time to respond to a protocol data request by transmitting additional protocol requests and other holding information.

FIG. 21 shows an example flow diagram of logic 2100 for providing a protocol data responder with additional time to respond to a protocol data request by transmitting additional protocol requests and other holding information. A data requester obtains a transmit opening (2102). The transmit opening may result from a RDG, or from a scheduled TXOP, as examples. The data requester determines whether to send a data request (2104). If so, the data requester prepares a transmission that includes the data request.

In particular, the data requester may transmit a B/ACK if needed or desired (2106), for example to acknowledge a RDG. The data requester may then determine the length of holding information, if any, that will extend the transmission (2108). As mentioned above, techniques for determining the holding information length are described in more detail below.

The data requester sends the data request (2110), e.g., in a MPDU in an A-MPDU. The data requester then determines whether to send holding information (2112). If so, the data requester may determine whether an additional data request is in the transmit queue (2114). If there is, the data requester may determine whether to send the additional data request instead of other types of holding information (2116). Thus, data requester may select the additional data request as holding information (2118) and transmit the holding information (2122). Otherwise, the data requester may select other types of holding information (2120) such as NOP packets and spacing delimiters to be transmitted (2122). The data requester may add holding information until no more needs to be sent, or until a termination condition arises (2124), at which point the data requester ends it transmission (2126).

Figure 22:
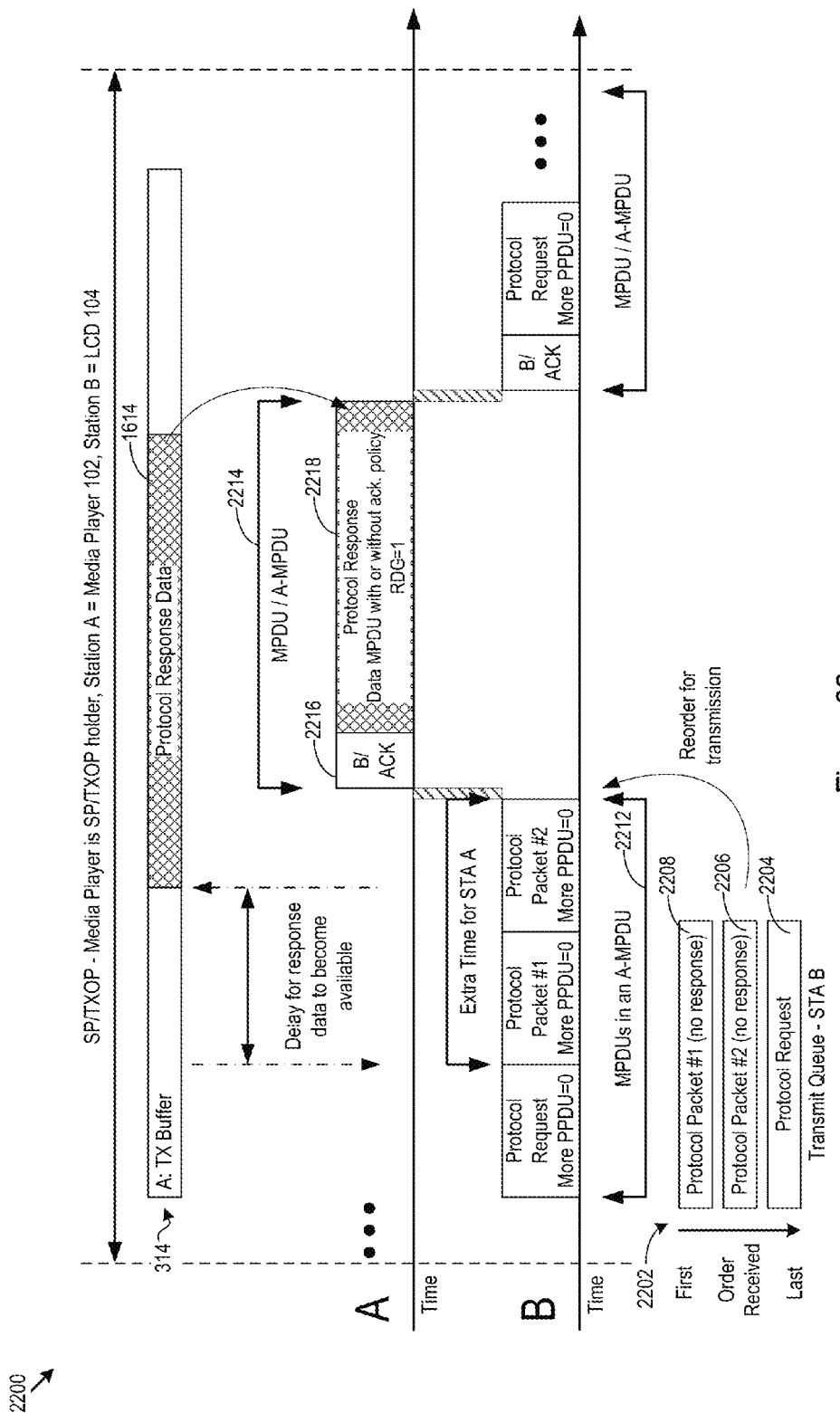
FIG. 22 shows an example communication diagram for how a protocol data requester (that does not own the transmit opportunity) may provide additional time for a protocol data responder to communicate responsive data by reordering transmission of protocol requests and protocol packets.

FIG. 22 shows an example communication diagram 2200 for how a protocol data requester (that does not own the transmit opportunity) may provide additional time for a protocol data responder to communicate responsive data by reordering transmission of protocol requests and protocol packets. In particular, FIG. 22 shows that the transmit queue 2202 includes a protocol data request 2204, and two protocol packets 2206 and 2208. The protocol packets 2206 and 2208 are not data requests that involve a response, but instead convey other protocol data to their intended recipients.

In this example, the data requester has obtained the transmit opening as a result of a RDG. The data requester creates an A-MPDU 2212 in which the data requester includes the protocol data request 2204. The data requester also extends the A-MPDU 2212 by including holding data. In this case, the holding data includes the protocol packets 2208 and 2206.

Note that in creating the A-MPDU 2212, the data requester has reordered the data in the transmit queue 2202. Specifically, in this example, the protocol request 2204 was received last, but was transmitted first in the A-MPDU 2212. Doing so gives the data responder the maximum amount of time to obtain the responsive data. In other words, the data responder obtains additional time to obtain the responsive data in an amount corresponding to the time used to transmit the protocol packet 2206 and the protocol packet 2208. The data requester may extend the A-MPDU 2212 using fewer or additional protocol packets if they are available, and may also transmit other types of holding information, including NOP packets and spacing delimiters, in any order or amount. As before, the data responder may respond with an A-MPDU 2214 that includes (if needed) a B/ACK 2216 and an MPDU 2218 with the responsive data.

Figure 23:
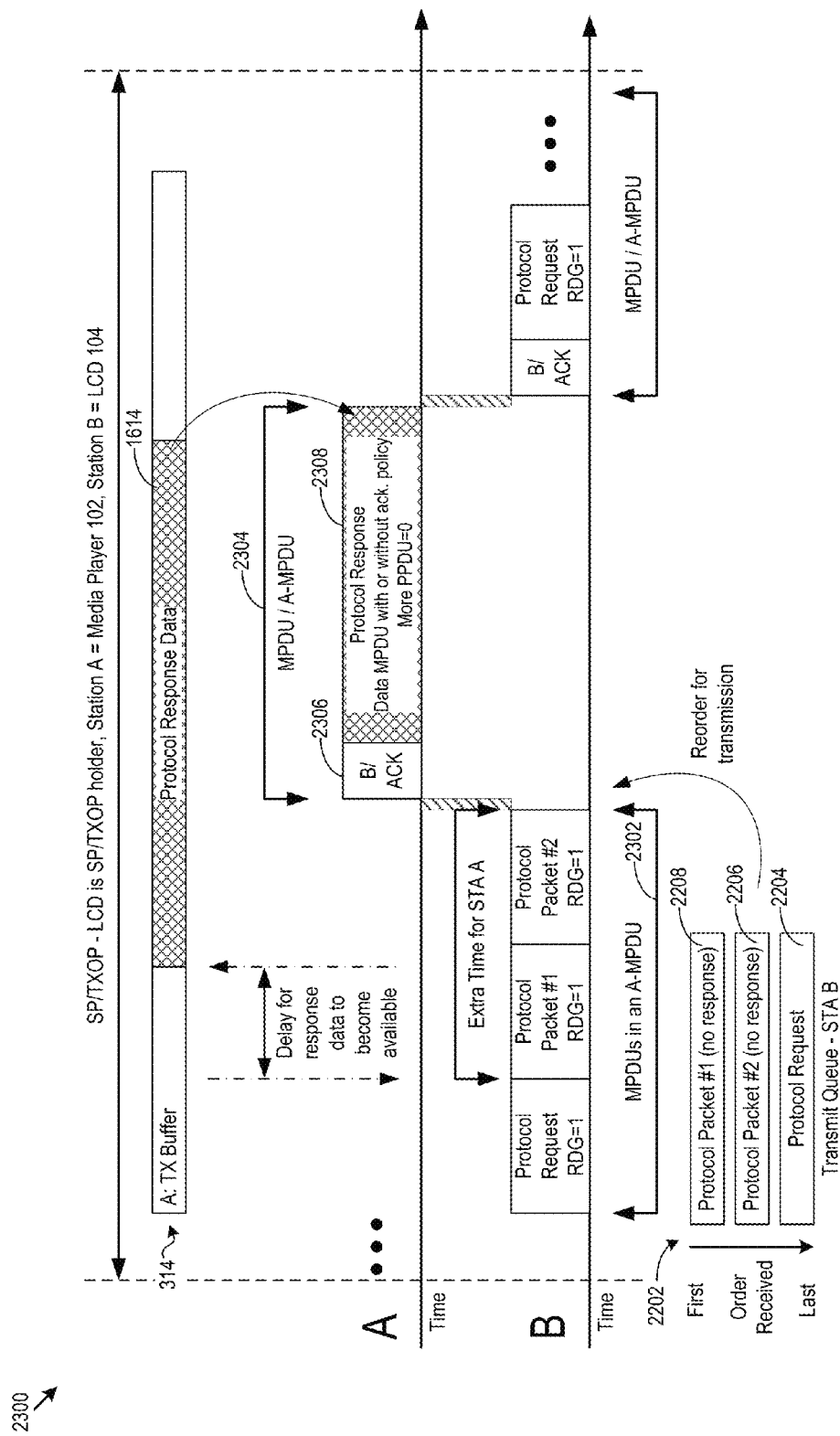
FIG. 23 shows an example communication diagram for how a protocol data requester (that does own the transmit opportunity) may provide additional time for a protocol data responder to communicate responsive data by reordering transmission of protocol requests and protocol packets.

FIG. 23 shows an example communication diagram 2300 for how a protocol data requester (that does own the transmit opportunity) may provide additional time for a protocol data responder to communicate responsive data. In this example, the data requester obtained the transmit opening as, for example, its scheduled TXOP from the network controller. Here too, the data requester reorders for transmission the protocol requests and protocol packets in the transmit queue 2202. The protocol request 2204 is sent first in the A-MPDU 2302, followed by the protocol packets 2206 and 2208. Here, the RDG bit is set to allow the data responder a transmit opportunity to respond with the data that is responsive to the protocol request 2204. The data responder does so in the A-MPDU 2304, including the B/ACK 2306 and the MPDU 2308 with the protocol response data. Note that the extra time provided by the first protocol packet 2208 was sufficient to cover the time needed to allow the data responder to obtain the responsive data. The data requester also transmitted the second protocol packet 2206 as well. In other words, it is not necessary to extend the transmission only enough to cover the time needed to obtain responsive data, but instead the data requester may extend the transmission for longer or shorter periods in any of the scenarios described in this document.

Figure 24:
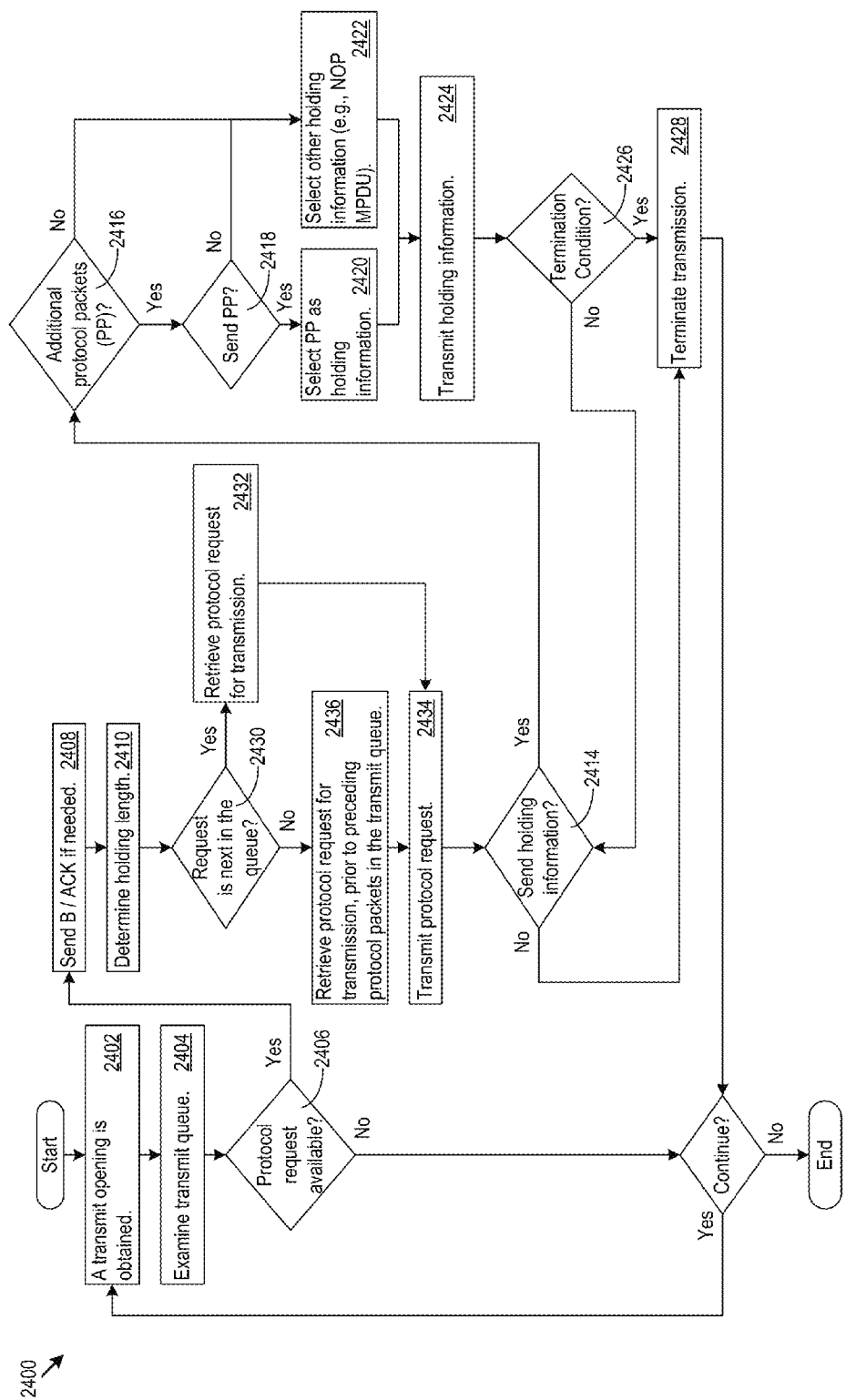
FIG. 24 shows an example flow diagram of logic for providing a protocol data responder with additional time to respond to a protocol data request by reordering transmission of protocol requests and protocol packets.

FIG. 24 shows an example flow diagram of logic 2400 or providing a protocol data responder with additional time to respond to a protocol data request by reordering transmission of protocol requests and protocol packets. A data requester obtains a transmit opening (2402). The transmit opening may result from a RDG, or from a scheduled TXOP, as examples. The data requester examines its transmit queue (2404), and determines whether a protocol data request is available to send (2406).

As part of its transmission when there is a protocol data request available, the data requester may transmit a B/ACK if needed or desired (2408), for example to acknowledge a RDG. The data requester may then determine the length of holding information, if any, that will extend the transmission (2410). When the protocol request is next in the transmit queue to be transmitted (2430), then the data requester may retrieve the protocol request (2432) and transmit the protocol request (2434). There is no reordering in this case.

However, when a protocol request is available and it is not next in the transmit queue (2430), the data requester may nevertheless retrieve the protocol request for transmission, prior to retrieving protocol packets that proceed the protocol request in the transmit queue (2434). In this example, the data requester sends the protocol request, reordered (with respect to the original packet order in the transmit queue) to be sent before other queued data that arrived in the transmit queue earlier.

The data requester may extend its transmission by sending holding information. When more holding information will be transmitted (2414), the data requester may determine whether any protocol packets are available in the transmit queue (2416). If there are, and the data requester determines to send a protocol packet (2418), then the data requester may choose a protocol packet from the transmit queue as the next holding information (2420), either in order or out of order from the transmit queue. Otherwise, the data requester may select NOP packets, spacing delimiters, or other types of holding information (2422). The data requester transmits the holding information that was selected (2424), thereby extending its transmission. The data requester may add holding information until no more needs to be sent, or until a termination condition arises (2426), at which point the data requester ends it transmission (2428).

Figure 25:
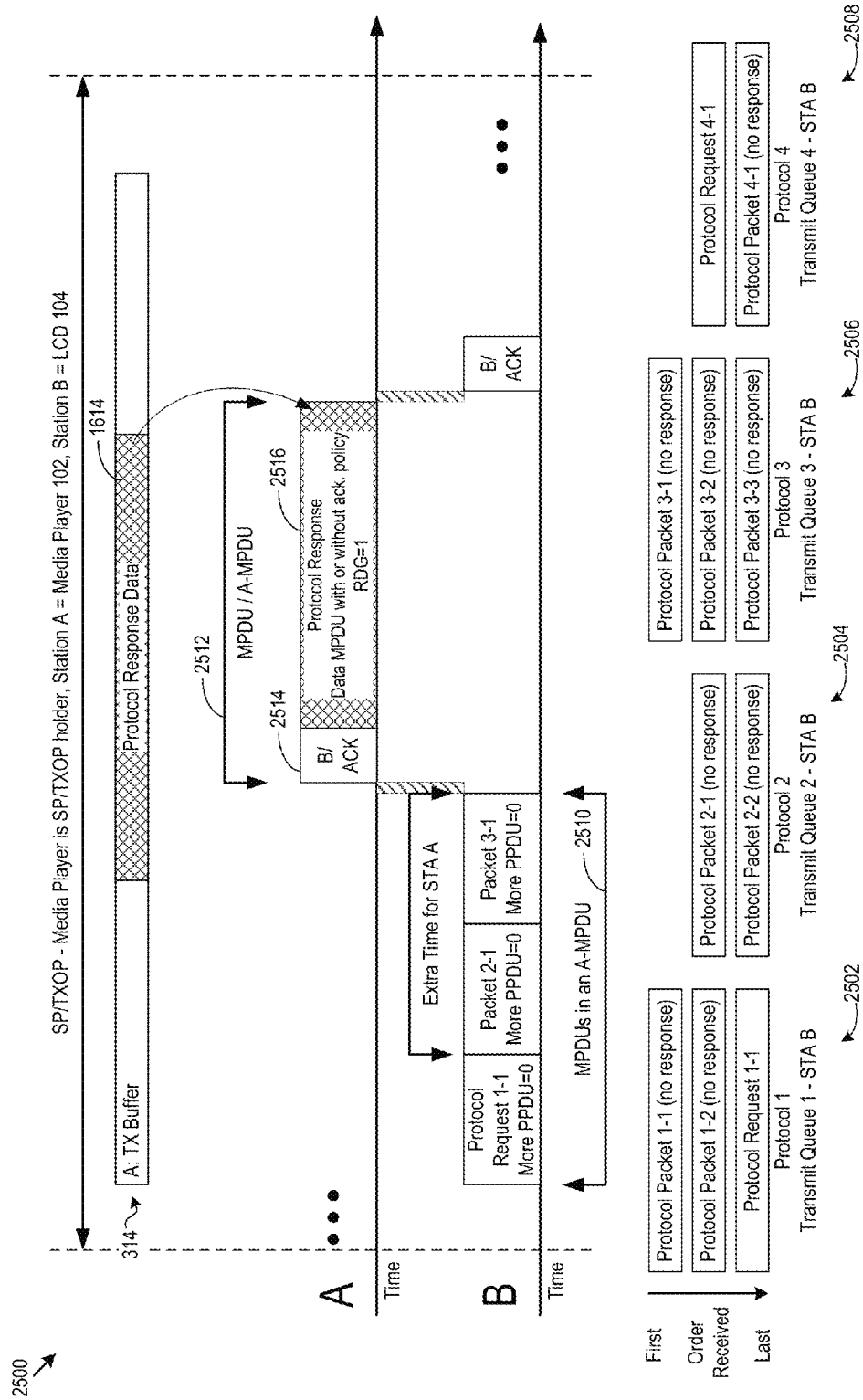
FIG. 25 shows an example communication diagram for how a protocol data requester (that does not own the transmit opportunity) may provide additional time for a protocol data responder to communicate responsive data by transmitting data from multiple different queues.

FIG. 25 shows an example communication diagram 2500 for how a protocol data requester (that does not own the transmit opportunity) may provide additional time for a protocol data responder to communicate responsive data by transmitting data from multiple different queues. In FIG. 25, the data requester has available four different transmit queues 2502, 2504, 2506, and 2508, each corresponding, for example, to a different protocol. There may be fewer or additional transmit queues. The data requester has obtained a transmit opening by virtue of a RDG from station A in this example.

The data requester is aware of the data in the various transmit queues, and is aware of the protocol request 1-1, for example. During its transmit opening, the data requester sends the protocol request 1-1 first. Because the data requester desires to extend its transmission to provide additional time for the data responder to respond, the data requester has selected other protocol packets to send. Specifically, in this example, the data requester has selected protocol packet 2-1 and protocol packet 3-1 to send after the protocol request 1-1. The data requester may select data from any transmit queue.

In some implementations, the data requester may select data in the order it is received (e.g., sending protocol packet 2-1 prior to protocol packet 2-2), or may send data out of order (e.g., sending protocol packet 3-2 before protocol packet 3-1). The order in which data is sent may vary depending on the transmit queue, with some queues adhering to in-order transmission, and other queues not having in-order transmission. Further, the order in which the data requester selects queues from which to pull data may also be pre-configured, and may be on a schedule (e.g., round-robin), random, according to queue length or importance or priority (e.g., send data from the longest, shortest, or highest priority queue first) or selected on any other basis.

In the example of FIG. 25, the data requester has provided additional time for the data responder by virtue of the protocol packet 2-1 and the protocol packet 3-1 in the A-MPDU 2510. The data requester may determine to send additional or fewer protocol packets, depending on the amount of time that the data requester will give to the data responder to obtain the responsive data. The data responder replies to the data requester in an A-MPDU 2512, for example. The A-MPDU 2512 includes (if needed or desired) a B/ACK 2514 and an MPDU 2516 with the responsive data.

Figure 26:
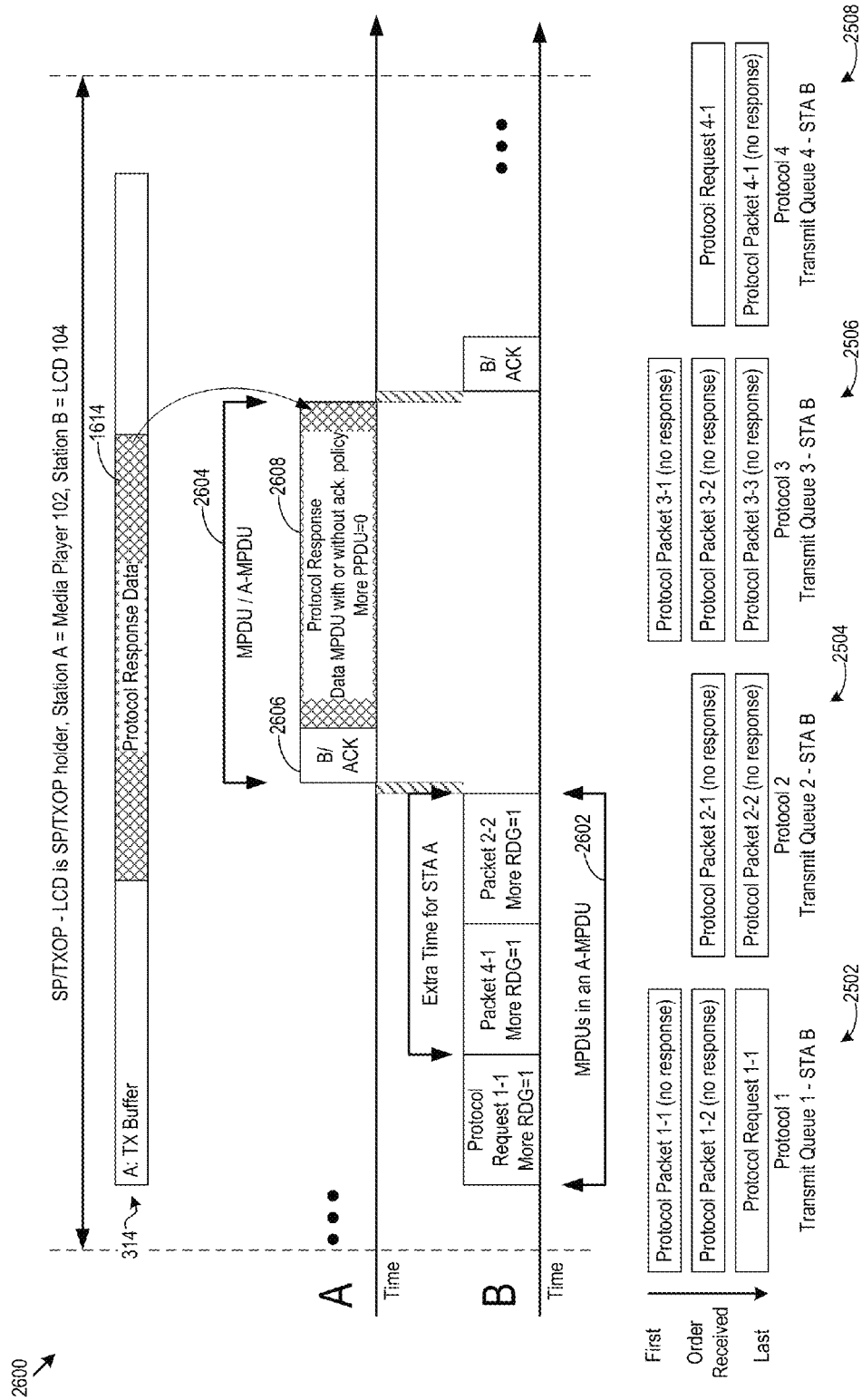
FIG. 26 shows an example communication diagram for how a protocol data requester (that does own the transmit opportunity) may provide additional time for a protocol data responder to communicate responsive data by transmitting data from multiple different queues.
Figure 27:
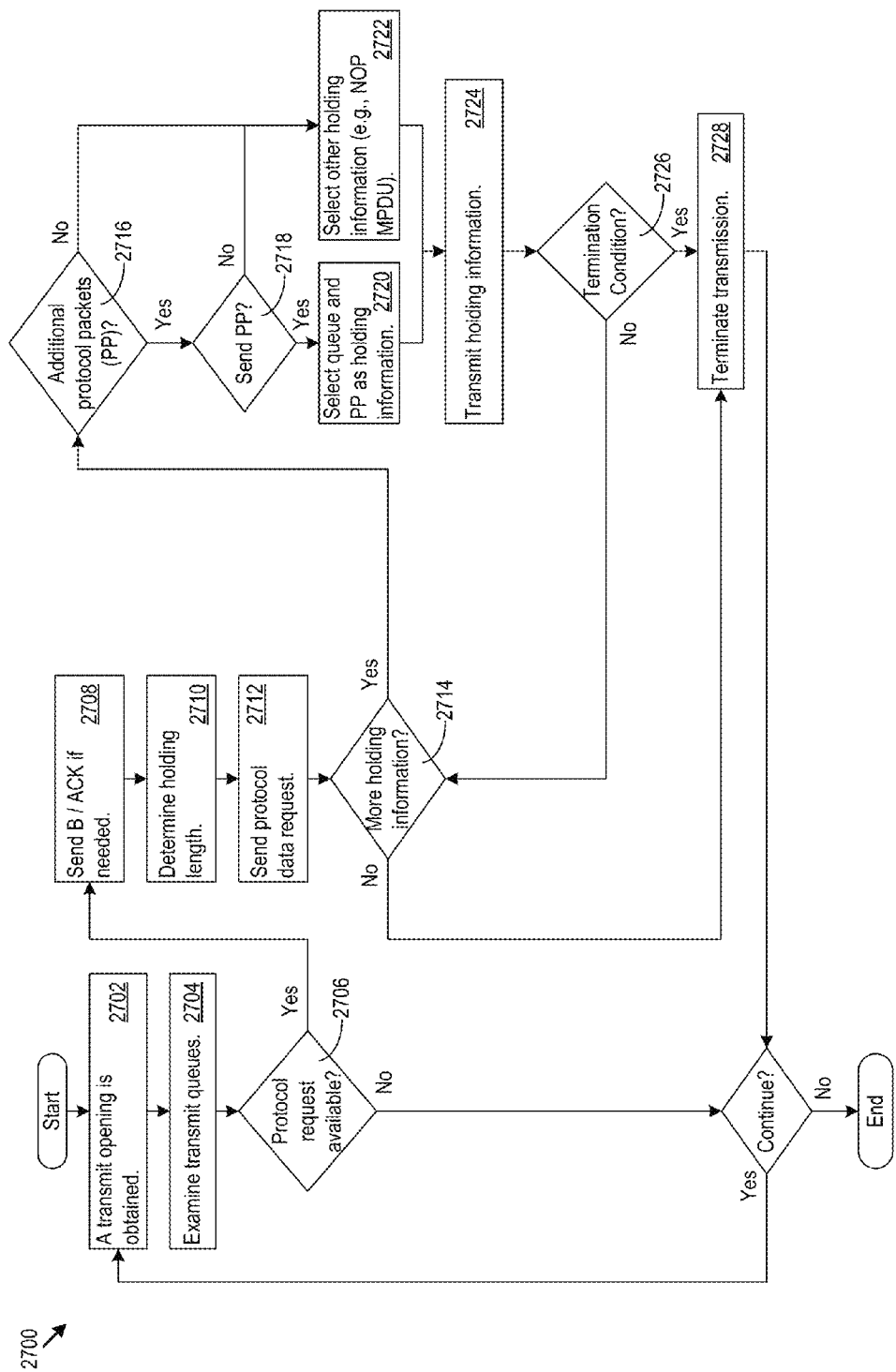
FIG. 27 shows an example flow diagram of logic for providing a protocol data responder with additional time to respond to a protocol data request by transmitting data from multiple different queues.

FIG. 26 also shows an example communication diagram 2600 for how a protocol data requester (that does own the transmit opportunity) may provide additional time for a protocol data responder to communicate responsive data by transmitting data from multiple different queues. In the example of FIG. 26, the data requester has obtained its transmit opening, for example, by being assigned a TXOP by the network controller. In FIG. 26, the data requester also selects from the multiple different protocol queues 2502-2508 to obtain holding data for a transmission that includes a protocol request. Specifically, in this example, the data requester has sent the protocol request 1-1 first in the A-MPDU 2602. Also, the data requester has selected the protocol packet 4-1 (in-order) from the protocol queue 2508 and the protocol packet 2-2 (out of order) from the protocol queue 2504 as holding information to follow the protocol request 1-1. The data responder replies to the data requester with the A-MPDU 2604 including (if needed or desired) a B/ACK 2606 and an MPDU 2608 with the responsive data FIG. 27 shows an example flow diagram of logic 2700 for providing a protocol data responder with additional time to respond to a protocol data request by transmitting data from multiple different queues. A data requester obtains a transmit opening (2702). The transmit opening may result from a RDG, from a scheduled TXOP, or in other ways. The data requester examines its multiple transmit queues (2704), and determines whether a protocol data request is available to send (2706).

As part of its transmission when there is a protocol data request available, the data requester may transmit a B/ACK if needed or desired (2708), for example to acknowledge a RDG. The data requester may then determine the length of holding information, if any, that will extend the transmission (2710). In this example, the data requester sends the protocol request, possibly out of order (2712). When more holding information will be transmitted (2714), the data requester may determine whether any protocol packets (e.g., that do not involve a response) are available in any of the available transmit queues (2716). In other implementations, the data requester may also select protocol request packets (that do involve a response) from the available transmit queues to send as holding information.

If there are available packets, and the data requester determines to send at least one (2718), then the data requester may choose a protocol packet from any selected transmit queue as the next holding information (2720). As noted above, this choice may be done either in order or out of order from any particular transmit queue. Otherwise, the data requester may select NOP packets, spacing delimiters, or other types of holding information (2722). The data requester transmits whatever holding information was selected (2724) to extend its transmission. The data requester may add holding information until no more needs to be sent, or until a termination condition arises (2726), at which point the data requester ends it transmission (2728).

Figure 28:
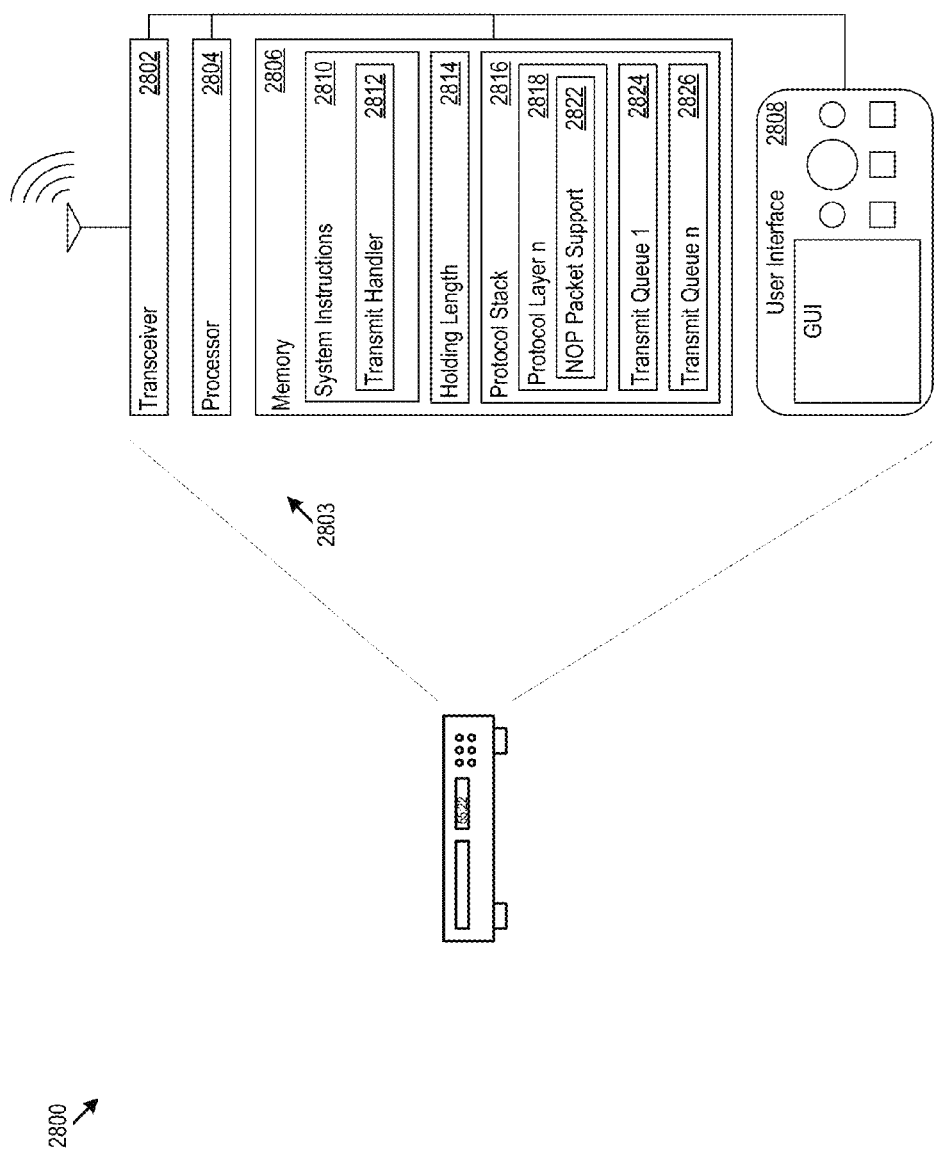
FIG. 28 shows an example of a station that provides a protocol data responder with additional time to obtain and communicate data that is responsive to a protocol request.

FIG. 28 shows an example of a station 2800 that may be a data requester and that provides a protocol data responder with additional time to obtain and communicate data that is responsive to a protocol request. The station 2800 may be implemented in a manner similar to the station 1000 described above. In the example given in FIG. 28, the station 2800 includes a transceiver 2802 and system logic 2803 in communication with the transceiver 1002. The system logic 2803 may be implemented in hardware, software or both. In one implementation, the system logic 2803 includes one or more processors 2804, a memory 2806, and a user interface 2808.

The transceiver 2802 may be wireless transceiver, and the transmitted and received signals may adhere to any of a diverse array of formats, protocols, modulations, frequency channels, bit rates, and encodings that presently or in the future may support reverse direction protocols. Thus, the transceiver 1002 may support the 802.11a/b/g/n/ac standards, the 60 GHz WiGig/802.11TGad specification, Bluetooth, Global System for Mobile communications (GSM), Time Division Multiple Access (TDMA), Frequency Division Multiple Access (FDMA), Code Division Multiple Access (CDMA), or other wireless access techniques or protocols.

The processor 2804 executes the system instructions 2810. The system instructions 2810 may include an operating system, application programs, device firmware, or other instructions. The system instructions 2810 include a transmit handler 2812. The transmit handler 2812 may implement in hardware, software, or both, the processing noted above and described below with respect to FIGS. 18, 21, 24, 27, and 29 for extending transmit openings using holding information to give a data responder additional time to obtain responsive data. For example, the transmit handler 2812 may transmit a data request, recognize that data responder will need more time to obtain responsive data, and instead of ending the transmission, may instead transmit holding information to give the data responder additional time to have responsive data available without missing the next transmit opening belonging to the data responder. The holding information may be NOP packets, spacing delimiters, or protocol packets that do not involve a response, or protocol data requests that do involve a response, chosen from any number of transmit queues. FIG. 28 shows the transmit queues as transmit queue 1 2824 through transmit queue 'n' 2826.

The station 2800 may implement one or more protocol stacks 2816, and any protocol stack may be organized into one or more layers. In the example in FIG. 28, the protocol stack 2816 shows an 'nth' stack layer 2818. The protocol stack 2816 may implement one or more of the WBE, WSE, WDE, WSD, FLA, and BRP protocols across one or more of the layers of the protocol stack 2816 as described above.

The protocol stack 2816 may support certain types of packets at any one or more of the layers of the protocol stack 2816. In some implementations of the protocol stack 2816, the protocol stack 2816 includes NOP packet support 2822, or support for any other type of packet that may extend a transmission. Said another way, the protocol stack 2816 may support packets that acts as holding information. As noted above, the holding information may allow a data requester to extend its data request transmission until response data is available to meet a particular data request.

Furthermore, the techniques described above for extending a transmission by the data requester, and for holding a transmit opening by the data responder, may be used together on both sides of a single exchange, or for a sequence of multiple exchanges between stations. That is, both the data requester and the data responder may play an active role in securing additional time for the data responder to obtain the data responsive to the data request. As one example, in the WiGig Serial Extension (WSE), there is the following sequence: Transfer Request from station A to station B, then a Transfer Response from station B to station A, then a Transfer Acknowledgment from station A to station B. Each of these messages may be treated as a request/response scenario to which the techniques described above may be applied.

The memory 2806 also stores operational parameters for the transmit handler 2812. One example is the holding length 2814. The holding length 2814 may be the amount of time needed by any given data responder to obtain data responsive to a data request that the station 2800 will transmit. The holding length 2814 may be set statically as a pre-configured parameter for particular data responders and particular data requests (e.g., varying by request protocol, the type of responder, or other characteristics), may be dynamically adapted according to operational conditions (e.g., as noted below in FIG. 29), may be set by an operator of the station manually, or may be set in other ways.

Figure 29:
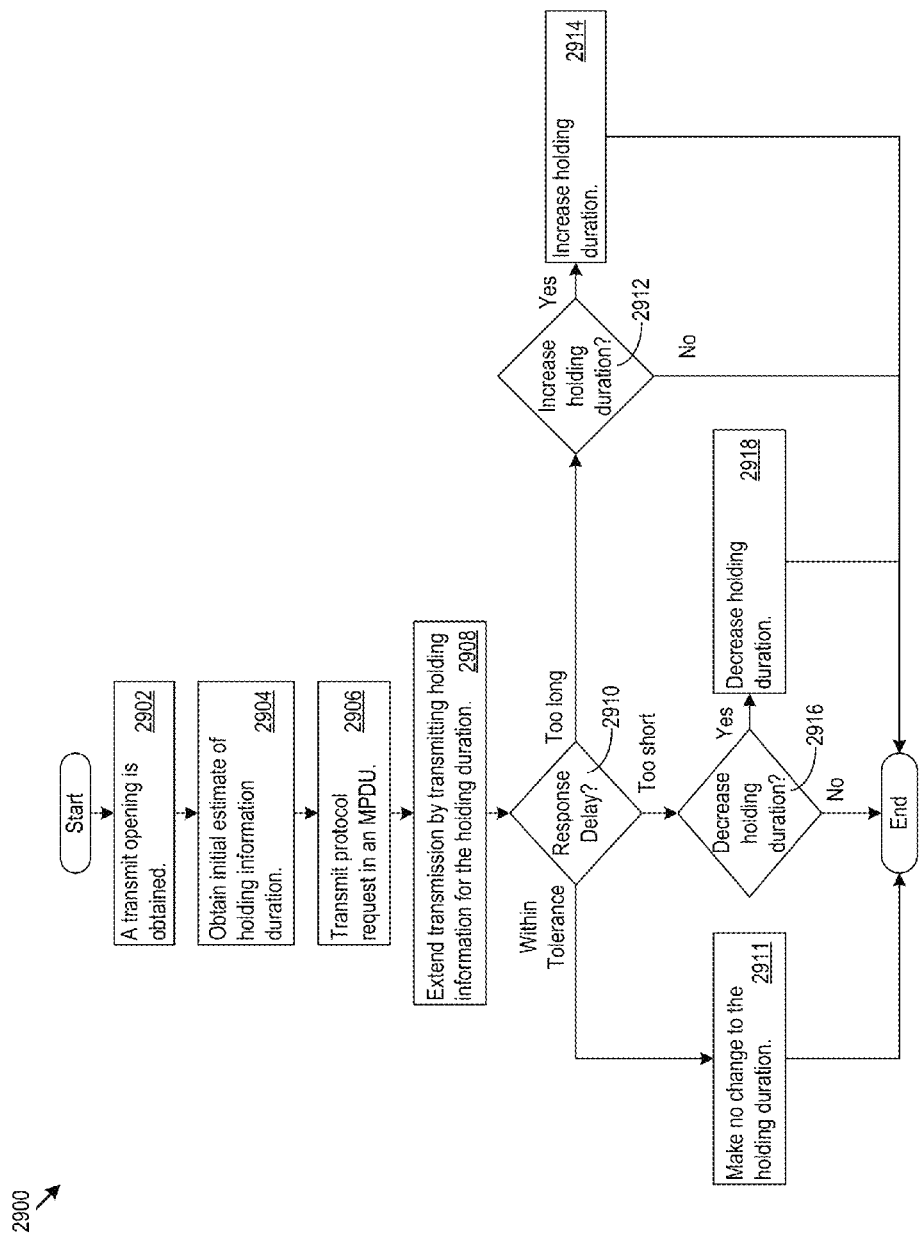
FIG. 29 shows an example of logic for iteratively obtaining an extension estimate for how long the protocol data requester will extend its transmission to allow the protocol responder to communicate responsive data.

FIG. 29 shows an example of logic 2900 for iteratively obtaining an extension estimate for how long the protocol data requester will extend its transmission to allow the protocol responder to communicate responsive data. The data requester obtains a transmit opening (2902) and an initial estimate of the holding information duration (2904). The initial estimate may be retrieved from a parameter set in memory, chosen randomly, start from zero (or another base), chosen to be a prior estimate already obtained or refined, or may be set in other ways. The data requester sends a protocol request, e.g., in an MPDU (2906) in an A-MPDU, and extends the transmission of the A-MPDU for the holding information duration (2908) using any type of holding information.

When the data response arrives, the data requester determines, as examples, whether the response delay was too long, too short, or within a preconfigured tolerance (2910). If the response delay was within tolerance, or otherwise met expectations, then the holding information duration may remain unchanged (2911).

If the response delay was too long, then the data requester may determine whether or not to increase the holding duration (2912). The holding duration may be increased in this scenario under the assumption that the data responder did not have enough time to obtain the responsive data in order to transmit the responsive data in its next transmit opening. In other words, the data responder missed the next transmit opening and had to wait for at least one later transmit opening to respond, and thus the response delay was too long. Increasing the holding duration gives the data responder additional time to obtain the responsive data without missing the next transmit opening. Accordingly, the holding duration may be increased (2914) by a pre-configured (e.g., as an operational parameter stored in memory), random, user-specified, or other amount.

If the response delay was too short (e.g., immediate), then the data requester may determine whether or not to decrease the holding duration (2916). The holding duration may be decreased in this scenario under the assumption that the data responder had more than enough time to obtain the responsive data in order to transmit the responsive data in its next transmit opening, and that it was unnecessary to extend the transmission of the data request for the entire holding duration. In other words, the data responder had enough time to obtain the response data to meet the next transmit opening, and so less holding information may be needed. Decreasing the holding duration gives the data responder less time to obtain the responsive data, but also reduces the transmission length of the data requester (possibly reducing the amount of time that NOP packets or spacing delimiters take up air time). Accordingly, the holding duration may be decreased (2918) by some pre-configured (e.g., as an operational parameter), random, user-specified, or other amount.

The length of holding information to transmit may be determined in other ways as well. As another example, the length of holding information may be determined by statistical analysis of device characteristics, processing speeds, past responses, and other parameters. Thus, as a specific example, if the analysis revealed that a data responder typically needs 10 microseconds to obtain responsive data for a particular type of protocol data request, the data requester may determine that 10 microseconds at its current transmit data rate is 1,500 bytes, and may then lengthen its transmission (after the data request MPDU) by 1,500 bytes of holding information (e.g., 375 spacing delimiters).

In terms of reordering packets for transmission, reordering may be done at several different points. As one example, the reordering may be done at the MAC service access point (SAP) when protocol packets are presented to the MAC. Packets may include serial numbers and reordering may be done prior to serial number assignment by the protocol stack (e.g., in the protocol layer, MAC layer, or both). Some implementations may include Non-QoS 802.11 STAs in which the common Sequence Number (SN) pool for management and data frames allows packets to be reordered. For QoS 802.11 STAs, there may be a separate Sequence Number (SN) pool for each TID, and then packets may be rearranged subject to acknowledgment policy and RD requirements. For example, three packets to be sent to the same destination with different TIDs (e.g., different protocols) and one of them having an immediate acknowledgment policy, may be aggregated into one A-MPDU, and can be rearranged. As another example, reordering may be done at the aggregation point when forming the A-MPDU. The ordering of MPDUs within an A-MPDU is generally not constrained, although stations adhering to certain standards may be under specific constraints, such as those noted in tables 8-283 through 8-287 in the IEEE 802.11 2012.

The methods, devices, and logic described above (e.g., the transmit handler 1012 and the transmit handler 2812) may be implemented in many different ways in many different combinations of hardware, software or both hardware and software. For example, all or parts of the station 1000 may include circuitry in a controller, a microprocessor, or an application specific integrated circuit (ASIC), or may be implemented with discrete logic or components, or a combination of other types of circuitry. All or part of the logic may be implemented as instructions for execution by a processor, controller, or other processing device and may be stored in a machine-readable or computer-readable medium such as flash memory, random access memory (RAM) or read only memory (ROM), flash memory, erasable programmable read only memory (EPROM) or other machine-readable medium such as a compact disc read only memory (CDROM), or magnetic or optical disk.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method comprising:
   determining to send a protocol request from a data requester to a data responder when a transmit opening exists;
   determining, at the data requester, an extension of the transmit opening to provide a data responder with an extended opportunity to respond with responsive data;
   transmitting the protocol request;
   determining a delay after which the responsive data is expected to be available; and
   when the delay exceeds a predetermined delay threshold, continuing a transmission after the protocol request by transmitting holding information to create the extension.

2. The method of claim 1, where:
   the responsive data comprises protocol response data returned in response to the protocol request.

3. The method of claim 1, where transmitting holding information comprises:
   transmitting a no-operation packet, a spacing delimiter, or any combination thereof.

4. The method of claim 1, further comprising:
   selecting between at least two different size granularities to create the extension.

5. The method of claim 1, where transmitting holding information comprises:
   transmitting holding information in units of a first size granularity; and
   transmitting holding information in units of a second size granularity different than the first size granularity.

6. The method of claim 1, wherein the delay is determined based on an expected response processing duration at the data responder.

7. The method of claim 1, wherein determining the delay comprises using a sequence of protocol requests and protocol responses from a receiver to approximate an amount of time needed by the receiver to respond with the responsive data.

8. A system comprising:
   transceiver;
   a memory; and
   a processor in communication with the memory and the transceiver, the memory comprising a transmit handler for execution by the processor that causes the processor to:
      determine to send a protocol data request through the transceiver to a receiver;
      determine a delay after which protocol data responsive to the protocol data request is expected; and
      when the delay exceeds a predetermined delay threshold:
         determine when a transmit opening exists for sending the protocol data request;
         transmit the protocol data request; and
         transmit holding information after the protocol data request through the transceiver to consume at least part of the delay.

9. The system of claim 8, where the holding information comprises:
   a protocol packet transmitted out of order from which it was originally received.

10. The system of claim 8, where the holding information comprises:
    a protocol packet when it is available in a transmit queue, and spacing delimiters, null packets, or both, when the protocol packet is not available.

11. The system of claim 8, where the predetermined delay threshold comprises a time measurement at which the receiver cannot respond with the protocol data on a next transmit opportunity for the receiver.

12. A product comprising:
    a non-transitory computer-readable medium; and
    instructions stored on the non-transitory computer-readable medium, the instructions configured to, when executed:
       determine to send a protocol request from a data requester to a data responder when a transmit opening exists;
       determine, at the data requester, an extension of the transmit opening to provide a data responder with an extended opportunity to respond with responsive data;
       transmit the protocol request;
       determine a delay after which the responsive data is expected to be available; and
       when the delay exceeds a predetermined delay threshold, continue a transmission after the protocol request by transmitting holding information to create the extension.

13. The product of claim 12, wherein the extension is configured to allow the responder to respond with responsive data on its next transmit opportunity.

14. The product of claim 12, wherein the instructions are further configured to retrieve the predetermined delay threshold from memory.

15. The product of claim 12, wherein the instructions are further configured to reorder queued protocol packets by sending the protocol request prior to previously queued protocol packets.

16. The product of claim 12, wherein the holding information comprises a second protocol request transmitted in a transmit queue.

17. The product of claim 16, wherein the second protocol request is transmitted instead of transmitting null bytes.

18. The product of claim 12, wherein the holding information comprises data of at least two different packet sizes.

19. The product of claim 12, wherein the holding information comprises a spacing delimiter defined in a protocol that also defines the protocol request.

20. The product of claim 12, wherein the holding information comprises:
    packets retrieved from a different protocol transmit queue than a source queue from which the protocol request was retrieved.

* * * * *